(12) United States Patent
Nishimura et al.

(10) Patent No.: US 12,455,231 B2
(45) Date of Patent: Oct. 28, 2025

(54) EUV LIGHT GENERATION APPARATUS, ELECTRONIC DEVICE MANUFACTURING METHOD, AND INSPECTION METHOD

(71) Applicant: GIGAPHOTON INC., Tochigi (JP)

(72) Inventors: Yuichi Nishimura, Tochigi (JP); Yoshifumi Ueno, Tochigi (JP)

(73) Assignee: GIGAPHOTON INC., Tochigi (JP)

( * ) Notice: Subject to any disclaimer, the term of this patent is extended or adjusted under 35 U.S.C. 154(b) by 457 days.

(21) Appl. No.: 17/812,924

(22) Filed: Jul. 15, 2022

(65) Prior Publication Data
US 2023/0101779 A1 Mar. 30, 2023

(30) Foreign Application Priority Data
Sep. 28, 2021 (JP) .................... 2021-158209

(51) Int. Cl.
*H05G 2/00* (2006.01)
*G01N 21/33* (2006.01)

(52) U.S. Cl.
CPC ........... *G01N 21/33* (2013.01); *H05G 2/0084* (2024.08); *H05G 2/0086* (2024.08); *G01N 2201/06113* (2013.01)

(58) Field of Classification Search
CPC ......... G01N 21/33; G01N 2201/06113; G01N 21/95; G01N 2021/335; H05G 2/008
See application file for complete search history.

(56) References Cited

U.S. PATENT DOCUMENTS

| 2010/0288937 | A1 | 11/2010 | Watanabe et al. |
| 2012/0307851 | A1 * | 12/2012 | Hori ...................... H01S 3/1611 372/27 |

(Continued)

FOREIGN PATENT DOCUMENTS

| CN | 112764321 A | 5/2021 |
| JP | 2011-135028 A | 7/2011 |

(Continued)

OTHER PUBLICATIONS

An Office Action; "Notice of Reasons for Rejection," mailed by the Japanese Patent Office on Mar. 18, 2025, which corresponds to Japanese Patent Application No. 2021-158209 and is related to U.S. Appl. No. 17/812,924; with English language translation.
Search Report mailed by the Netherlands Patent Office on Aug. 26, 2025, which corresponds to Dutch Patent Application No. 2032708, and is related to U.S. Appl. No. 17/812,924; with partial English translation.

*Primary Examiner* — David P Porta
*Assistant Examiner* — Mamadou Faye
(74) *Attorney, Agent, or Firm* — Studebaker Brackett PLLC

(57) ABSTRACT

An EUV light generation apparatus includes a chamber; a prepulse laser outputting prepulse laser light; a main pulse laser outputting main pulse laser light; a combiner combining optical paths of the prepulse laser light and the main pulse laser light; a light concentrating unit concentrating, on the target, the prepulse laser light and the main pulse laser light having the optical paths combined; a stage changing a position of the light concentrating unit; a first actuator changing a travel direction of the main pulse laser light; an EUV light sensor detecting EUV energy; a laser energy sensor detecting pulse energy of the main pulse laser light; and an EUV light generation control unit controlling the stage so that temporal variation of the EUV energy decreases and controlling the first actuator so that a ratio of the EUV energy to the pulse energy increases.

10 Claims, 19 Drawing Sheets

(56) References Cited

U.S. PATENT DOCUMENTS

| | | |
|---|---|---|
| 2014/0203194 A1 | 7/2014 | Nagano et al. |
| 2016/0135276 A1* | 5/2016 | Abe .................. H05G 2/008 250/504 R |
| 2017/0048959 A1 | 2/2017 | Riggs et al. |
| 2018/0177036 A1 | 6/2018 | Hosoda et al. |
| 2018/0284617 A1 | 10/2018 | Nishimura et al. |
| 2018/0314161 A1 | 11/2018 | Suzuki |
| 2018/0343729 A1 | 11/2018 | Nishimura et al. |
| 2021/0263422 A1 | 8/2021 | Rafac et al. |

FOREIGN PATENT DOCUMENTS

| | | |
|---|---|---|
| JP | 2013-093308 A | 5/2013 |
| JP | 2018-529990 A | 10/2018 |
| WO | 2017/042881 A1 | 3/2017 |
| WO | 2017/130346 A1 | 8/2017 |
| WO | 2017/145366 A1 | 8/2017 |

\* cited by examiner

EUV LIGHT GENERATION APPARATUS, ELECTRONIC DEVICE MANUFACTURING METHOD, AND INSPECTION METHOD

CROSS-REFERENCE TO RELATED APPLICATIONS

The present application claims the benefit of Japanese Patent Application No. 2021-158209, filed on Sep. 28, 2021, the entire contents of which are hereby incorporated by reference.

BACKGROUND

1. Technical Field

The present disclosure relates to an EUV light generation apparatus, an electronic device manufacturing method, and an inspection method.

2. Related Art

Recently, miniaturization of a transfer pattern in optical lithography of a semiconductor process has been rapidly proceeding along with miniaturization of the semiconductor process. In the next generation, microfabrication at 10 nm or less will be required. Therefore, it is expected to develop a semiconductor exposure apparatus that combines an apparatus for generating extreme ultraviolet (EUV) light having a wavelength of about 13 nm with a reduced projection reflection optical system.

As the EUV light generation apparatus, a laser produced plasma (LPP) type apparatus using plasma generated by irradiating a target substance with laser light has been developed.

LIST OF DOCUMENTS

Patent Documents

Patent Document 1: US Patent Application Publication No. 2014/0203194
Patent Document 2: US Patent Application Publication No. 2018/0343729

SUMMARY

An EUV light generation apparatus according to an aspect of the present disclosure includes a prepulse laser configured to output prepulse laser light to be radiated to a target supplied into a chamber; a main pulse laser configured to output main pulse laser light to be radiated to the target irradiated with the prepulse laser light; a combiner configured to combine optical paths of the prepulse laser light and the main pulse laser light; a light concentrating unit configured to concentrate, on the target, the prepulse laser light and the main pulse laser light having the optical paths combined; a stage configured to change a position of the light concentrating unit; a first actuator arranged upstream of the combiner and configured to change a travel direction of the main pulse laser light before the optical paths are combined; an EUV light sensor configured to detect EUV energy of EUV light radiated from the target irradiated with the main pulse laser light; a laser energy sensor configured to detect pulse energy of the main pulse laser light before being radiated to the target; and an EUV light generation control unit configured to control the stage so that temporal variation of the EUV energy detected by the EUV light sensor decreases and to control the first actuator so that a ratio of the EUV energy with respect to the pulse energy detected by the laser energy sensor increases.

An electronic device manufacturing method according to another aspect of the present disclosure includes generating EUV light by irradiating a target with pulse laser light in an EUV light generation apparatus, outputting the EUV light to an exposure apparatus, and exposing a photosensitive substrate to the EUV light in the exposure apparatus to manufacture an electronic device. Here, the EUV light generation apparatus includes a prepulse laser configured to output prepulse laser light to be radiated to the target supplied into a chamber; a main pulse laser configured to output main pulse laser light to be radiated to the target irradiated with the prepulse laser light; a combiner configured to combine optical paths of the prepulse laser light and the main pulse laser light; a light concentrating unit configured to concentrate, on the target, the prepulse laser light and the main pulse laser light having the optical paths combined; a stage configured to change a position of the light concentrating unit; a first actuator arranged upstream of the combiner and configured to change a travel direction of the main pulse laser light before the optical paths are combined; an EUV light sensor configured to detect EUV energy of the EUV light radiated from the target irradiated with the main pulse laser light; a laser energy sensor configured to detect pulse energy of the main pulse laser light before being radiated to the target; and an EUV light generation control unit configured to control the stage so that temporal variation of the EUV energy detected by the EUV light sensor decreases and to control the first actuator so that a ratio of the EUV energy with respect to the pulse energy detected by the laser energy sensor increases.

An inspection method according to another aspect of the present disclosure includes generating EUV light by irradiating a target with pulse laser light in an EUV light generation apparatus, outputting the EUV light to an inspection apparatus as a light source for inspection, and exposing a mask to the EUV light to inspect the mask in the inspection apparatus. Here, the EUV light generation apparatus includes a prepulse laser configured to output prepulse laser light to be radiated to the target supplied into a chamber; a main pulse laser configured to output main pulse laser light to be radiated to the target irradiated with the prepulse laser light; a combiner configured to combine optical paths of the prepulse laser light and the main pulse laser light; a light concentrating unit configured to concentrate, on the target, the prepulse laser light and the main pulse laser light having the optical paths combined; a stage configured to change a position of the light concentrating unit; a first actuator arranged upstream of the combiner and configured to change a travel direction of the main pulse laser light before the optical paths are combined; an EUV light sensor configured to detect EUV energy of the EUV light radiated from the target irradiated with the main pulse laser light; a laser energy sensor configured to detect pulse energy of the main pulse laser light before being radiated to the target; and an EUV light generation control unit configured to control the stage so that temporal variation of the EUV energy detected by the EUV light sensor decreases and to control the first actuator so that a ratio of the EUV energy with respect to the pulse energy detected by the laser energy sensor increases.

BRIEF DESCRIPTION OF THE DRAWINGS

Embodiments of the present disclosure will be described below merely as examples with reference to the accompanying drawings.

DESCRIPTION OF EMBODIMENTS

Figure 1:
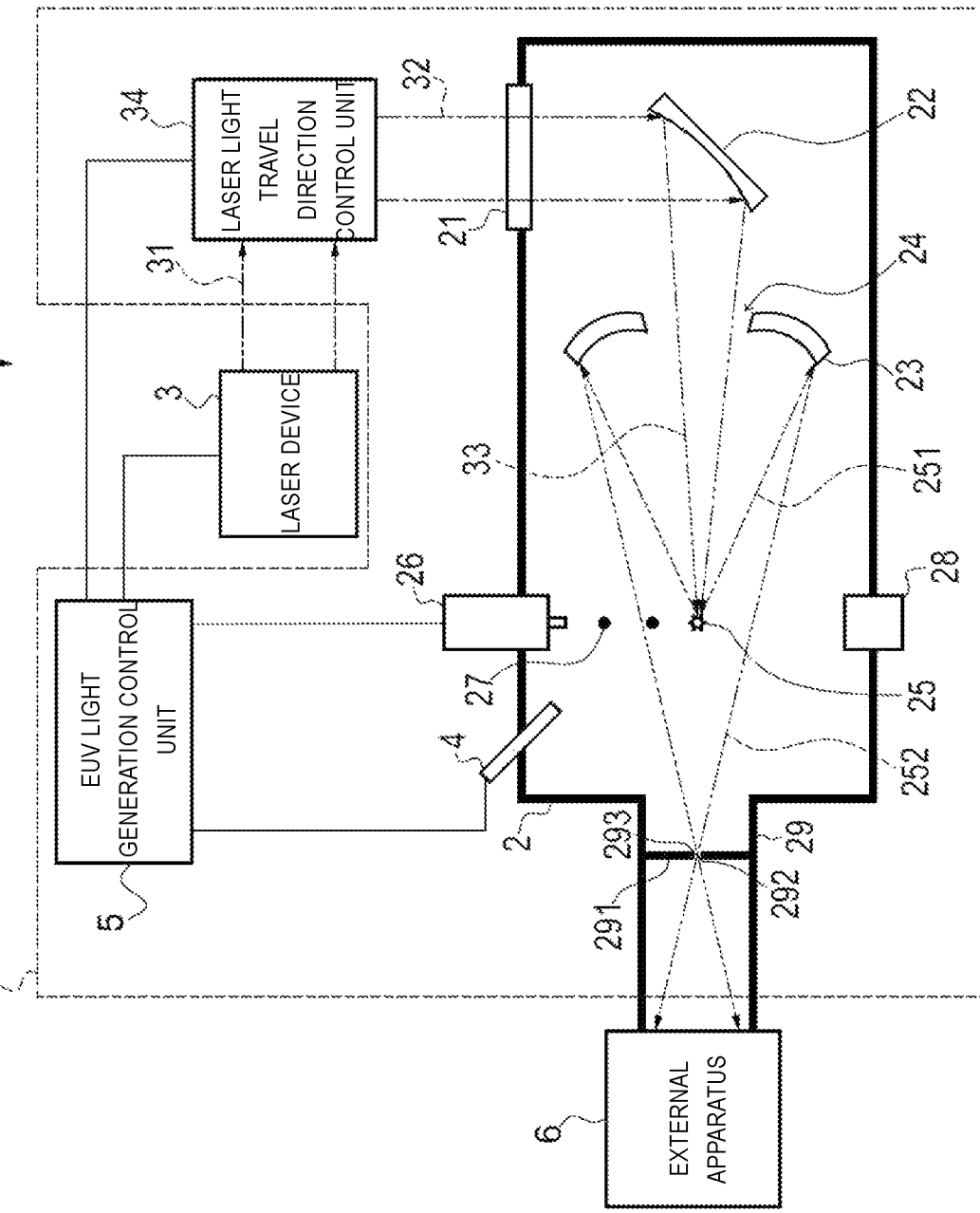
FIG. 1 is a diagram schematically showing the configuration of an LPP EUV light generation apparatus.

<Contents>
1. Overall description of EUV light generation system
   1.1 Configuration
   1.2 Operation
2. EUV light generation apparatus according to comparative example
   2.1 Configuration
   2.2 Operation
   2.3 Problem
3. EUV light generation apparatus of first embodiment
   3.1 Configuration
   3.2 Operation
   3.3 Effects
4. EUV light generation apparatus of second embodiment
   4.1 Configuration
   4.2 Operation
   4.3 Effects
   4.4 Modification
5. Others Hereinafter, embodiments of the present disclosure will be described in detail with reference to the drawings. The embodiments described below show some examples of the present disclosure and do not limit the contents of the present disclosure. Also, all configurations and operation described in the embodiments are not necessarily essential as configurations and operation of the present disclosure. Here, the same components are denoted by the same reference numerals, and duplicate description thereof is omitted.

1. Overall Description of EUV Light Generation System

1.1 Configuration

FIG. 1 schematically shows the configuration of an LPP EUV light generation system 11. An EUV light generation apparatus 1 is used with at least one laser device 3. In the present disclosure, a system including the EUV light generation apparatus 1 and the laser device 3 is referred to as the EUV light generation system 11. As shown in FIG. 1 and described in detail below, the EUV light generation apparatus 1 includes a chamber 2 and a target supply device 26. The chamber 2 is configured sealable. The target supply device 26 is attached, for example, to penetrate a wall of the chamber 2. The material of the target 27 output from the target supply device 26 includes tin. The material of the target 27 may also include a combination of tin and terbium, gadolinium, lithium, or xenon. The target 27 has a droplet shape.

At least one through hole is formed in the wall of the chamber 2. The through hole is provided with a window 21. Pulse laser light 32 output from the laser device 3 passes through the window 21. For example, an EUV light concentrating mirror 23 having a spheroidal reflection surface is arranged in the chamber 2. The EUV light concentrating mirror 23 has first and second focal points. A multilayer reflection film in which, for example, molybdenum and silicon are alternately stacked is formed on a surface of the EUV light concentrating mirror 23. The EUV light concentrating mirror 23 is arranged, for example, such that the first focal point is located in a plasma generation region 25 and the second focal point is located at an intermediate focal point (IF) 292. A through hole 24 is formed at the center of the EUV light concentrating mirror 23. Pulse laser light 33 passes through the through hole 24.

The EUV light generation apparatus 1 includes an EUV light generation control unit 5, a target sensor 4, and the like. The target sensor 4 has, for example, an imaging function, and detects the presence, trajectory, position, velocity, and the like of the target 27.

Further, the EUV light generation apparatus 1 includes a connection portion 29 providing communication between the inside of the chamber 2 and the inside of an external apparatus 6. A wall 291 in which an aperture 293 is formed is arranged in the connection portion 29. The wall 291 is arranged such that the aperture 293 is located at the second focal point of the EUV light concentrating mirror 23.

Further, the EUV light generation apparatus 1 includes a laser light travel direction control unit 34, a laser light concentrating mirror 22, a target collection unit 28 for collecting the target 27, and the like. The laser light travel direction control unit 34 includes an optical element for defining the travel direction of the laser light, and an actuator for adjusting the position, posture, and the like of the optical element.

1.2 Operation

Referring to FIG. 1, the pulse laser light 31 output from the laser device 3 passes through the window 21 through the laser light travel direction control unit 34 and enters the chamber 2 as the pulse laser light 32. The pulse laser light 32 travels along at least one laser light path in the chamber 2, is reflected by the laser light concentrating mirror 22, and is radiated to at least one target 27 as the pulse laser light 33.

The target supply device 26 outputs the target 27 toward the plasma generation region 25 in the chamber 2. The target 27 is irradiated with at least one pulse included in the pulse laser light 33. The target 27 irradiated with the pulse laser light 33 is turned into plasma, and radiation light 251 is radiated from the plasma. The EUV light concentrating mirror 23 reflects EUV light contained in the radiation light 251 at higher reflectance than light in other wavelength ranges. Reflection light 252 including the EUV light reflected by the EUV light concentrating mirror 23 is concentrated on the intermediate focal point 292 and output to the external apparatus 6. Here, one target 27 may be irradiated with a plurality of pulses included in the pulse laser light 33. Hereinafter, the reflection light 252 may be referred to as EUV light 252.

The EUV light generation control unit 5 controls the entire EUV light generation system 11. The EUV light generation control unit 5 processes image data or the like of the target 27 imaged by the target sensor 4. Further, the EUV light generation control unit 5 controls, for example, the timing at which the target 27 is output, the output direction of the target 27, and the like. Furthermore, the EUV light generation control unit 5 controls, for example, the oscillation timing of the laser device 3, the travel direction of the pulse laser light 32, the light concentration position of the pulse laser light 33, and the like. The above-described various kinds of control are merely examples, and other control may be added as necessary.

2. EUV Light Generation Apparatus According to Comparative Example

2.1 Configuration

Figure 2:
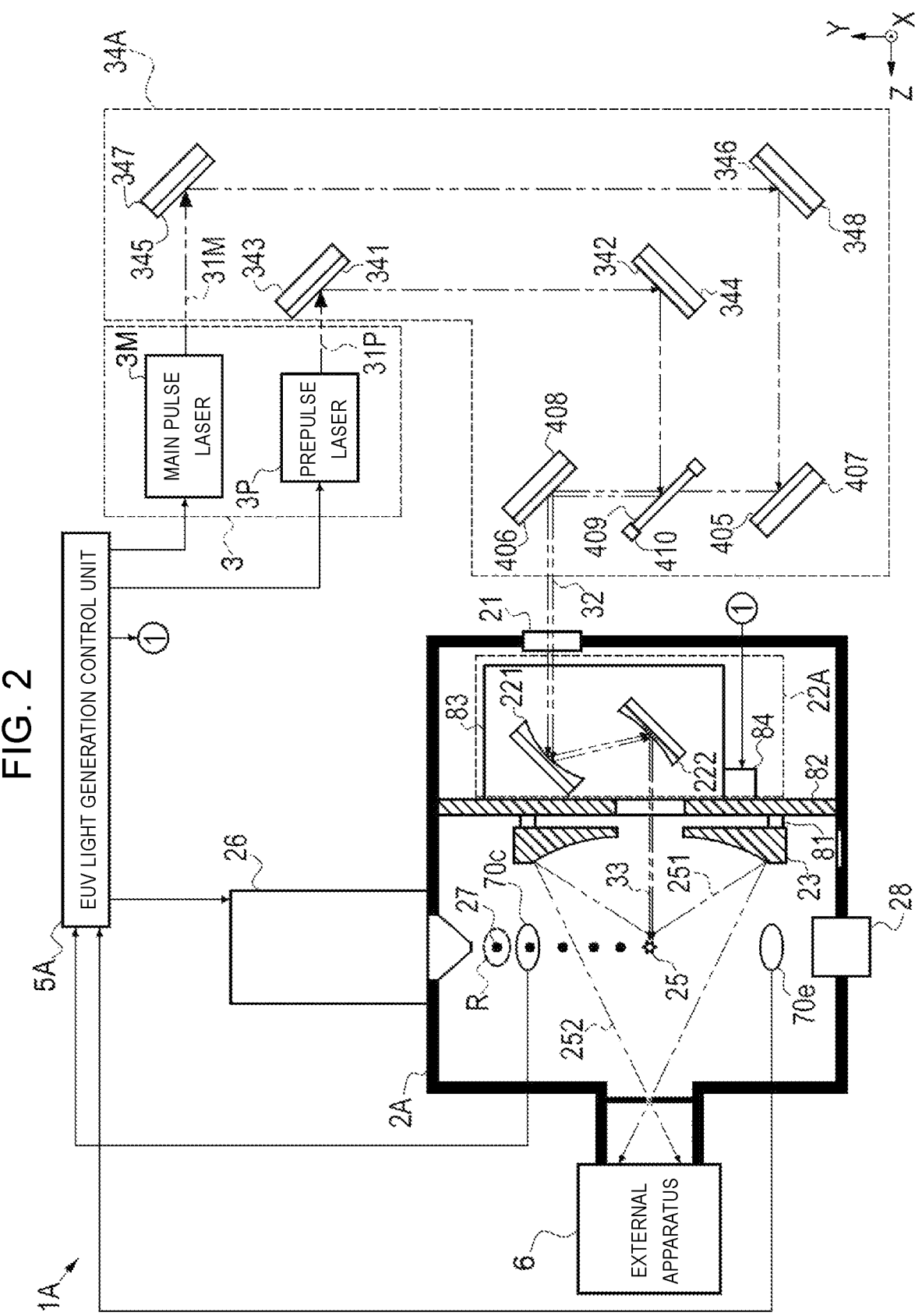
FIG. 2 schematically shows the configuration of the EUV light generation apparatus including a target supply device according to a comparative example.
Figure 3:
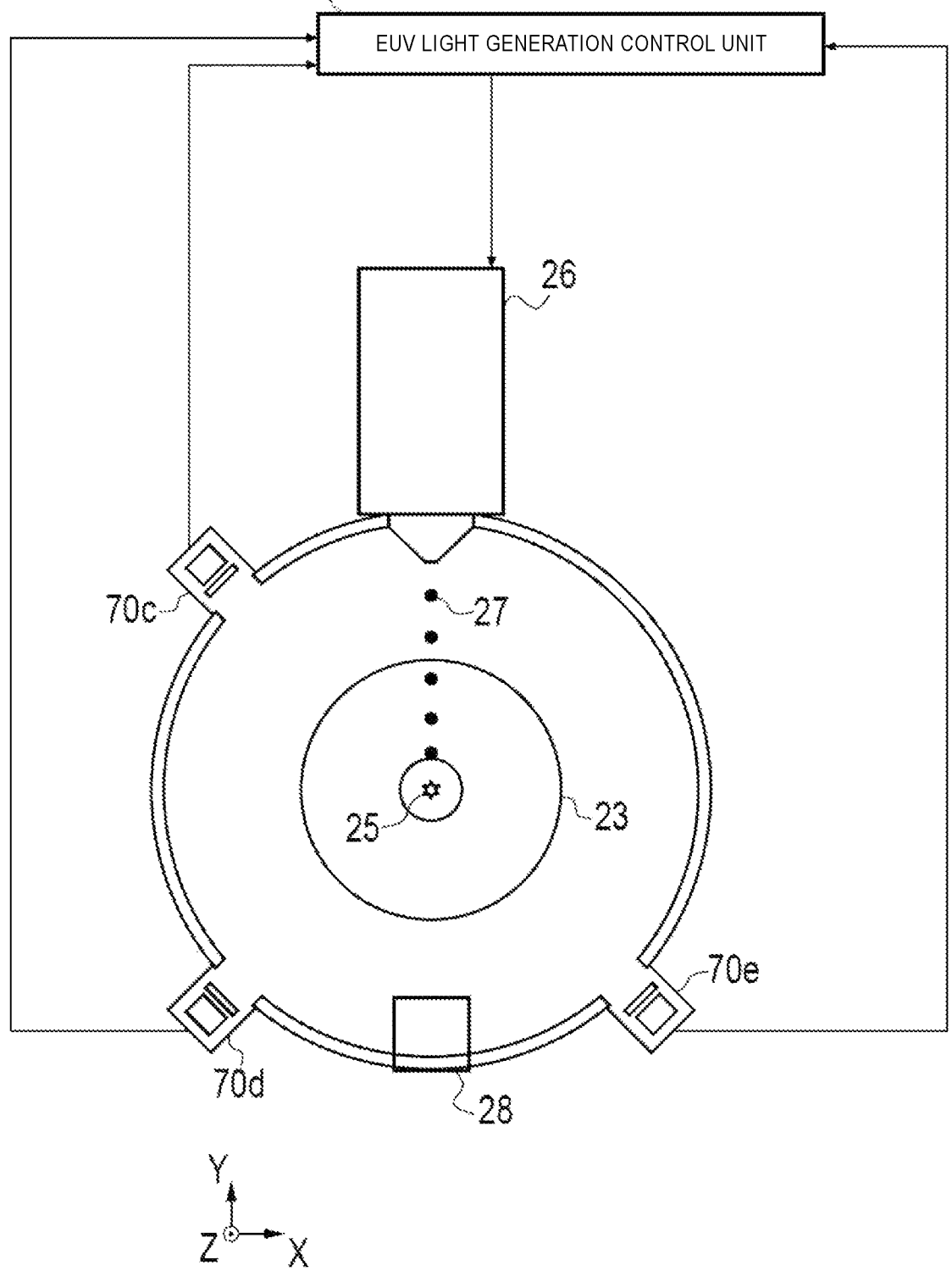
FIG. 3 is a diagram showing the arrangement of EUV light sensors.

FIG. 2 is a partial sectional view showing the configuration of an EUV light generation apparatus 1A according to a comparative example. FIG. 3 is a diagram showing the arrangement of EUV light sensors 70c to 70e. As shown in FIGS. 2 and 3, the output direction of EUV light is represented by the Z direction. The direction opposite to the output direction of the target 27 is represented by the Y direction. The direction perpendicular to both the Z direction and the Y direction is represented by the X direction. FIG. 2 shows the EUV light generation apparatus 1A viewed in the X direction. FIG. 3 shows the EUV light generation apparatus 1A viewed in the −Z direction.

The EUV light generation apparatus 1A includes an EUV light generation control unit 5A, a chamber 2A, the target supply device 26, the laser device 3, a laser light travel direction control unit 34A, and the EUV light sensors 70c to 70e.

A light concentrating unit 22a, the EUV light concentrating mirror 23, the target collection unit 28, an EUV light concentrating mirror holder 81, plates 82, 83, and a stage 84 are provided in the chamber 2A. The target supply device 26 is attached to the chamber 2A. The EUV light sensors 70c to 70e are arranged in the chamber 2A as described below.

The target supply device 26 is arranged to penetrate a through hole formed in a wall of the chamber 2A. The target supply device 26 stores the molten material of the target 27 therein. The target supply device 26 has an opening located inside the chamber 2A. A vibrating device (not shown) is arranged in the vicinity of the opening of the target supply device 26.

The target supply device 26 includes an XZ stage (not shown). The EUV light generation control unit 5A controls the XZ stage based on the output of the target sensor 4 (see FIG. 1). The trajectory of the target 27 can be adjusted so that the target 27 passes through the plasma generation region 25 by controlling the XZ stage.

The laser device 3 includes a prepulse laser 3P and a main pulse laser 3M. The prepulse laser 3P is configured to output prepulse laser light 31P. The main pulse laser 3M is configured to output main pulse laser light 31M. The prepulse laser 3P is, for example, a YAG laser device or a laser device using Nd:YVO4. The main pulse laser 3M is, for example, a CO2 laser device. The main pulse laser 3M may be a YAG laser device or a laser device using Nd:YVO4.

The laser light travel direction control unit 34A includes high reflection mirrors 341, 342, 345, 346, 405, 406, and a combiner 409. The high reflection mirrors 341, 342, 345, 346, 405, 406 and the combiner 409 are supported by holders 343, 344, 347, 348, 407, 408, 410, respectively.

The high reflection mirrors 341, 342 are arranged on an optical path of the prepulse laser light 31P.

The high reflection mirrors 345, 346 are arranged on an optical path of the main pulse laser light 31M.

The high reflection mirror 405 is arranged on an optical path of the main pulse laser light 31M reflected by the high reflection mirror 346.

The combiner 409 is located on an optical path of the prepulse laser light 31P reflected by the high reflection mirror 342. The combiner 409 is also located on an optical path of the main pulse laser light 31M reflected by the high reflection mirror 405. The combiner 409 is configured to reflect the prepulse laser light 31P at high reflectance and transmit the main pulse laser light 31M at high transmittance. The combiner 409 is configured to substantially match the optical path axes of the prepulse laser light 31P and the main pulse laser light 31M.

The high reflection mirror 406 is arranged on an optical path of the prepulse laser light 31P reflected by the combiner 409 and an optical path of the main pulse laser light 31M transmitted through the combiner 409. The high reflection mirror 406 is configured to reflect the prepulse laser light 31P and the main pulse laser light 31M toward the inside of the chamber 2A. In the present disclosure, for convenience of explanation, the prepulse laser light 31P and the main pulse laser light 31M reflected by the high reflection mirror 406 may be collectively referred to as the pulse laser light 32.

The plate 82 is fixed to the chamber 2. The plate 83 is supported by the plate 82. The light concentrating unit 22A includes a laser light concentrating mirror 221 and a laser light concentrating mirror 222.

The stage 84 is capable of adjusting the position of the plate 83 with respect to the plate 82. By adjusting the position of the plate 83, the positions of the laser light concentrating mirror 221 and the laser light concentrating mirror 222 are adjusted. The positions of the laser light concentrating mirror 221 and the laser light concentrating mirror 222 are adjusted so that the pulse laser light 33 reflected by these mirrors is concentrated at the plasma generation region 25. For convenience of explanation, the prepulse laser light 31P and the main pulse laser light 31M reflected by the laser light concentrating mirror 221 and the laser light concentrating mirror 222 may be collectively referred to as the pulse laser light 33.

The EUV light concentrating mirror 23 is fixed to the plate 82 via the EUV light concentrating mirror holder 81.

The target sensor 4 is a sensor for detecting the target 27 passing through a target detection region R. The target detection region R is a predetermined region in the chamber 2A, and is a region located at a predetermined position on the target trajectory between the target supply device 26 and the plasma generation region 25.

Each of the EUV light sensors 70c to 70e is arranged at a position enabling evaluation of the EUV energy centroid position to be described later. For example, as shown in FIG. 3, each of the EUV light sensors 70c to 70e is attached to the wall of the chamber 2A. Each of the EUV light sensors 70c to 70e is directed toward the plasma generation region 25. The EUV light sensors 70c, 70d are arranged at positions to be a mirror image with respect to each other across a virtual plane being parallel to the XZ plane and passing through the plasma generation region 25. The EUV light sensors 70d, 70e are arranged at positions to be a mirror image with respect to each other across a virtual plane being parallel to the YZ plane and passing through the plasma generation region 25.

A pulse energy centroid position of the EUV light 252 is one of indices reflecting the position of the target 27 to be irradiated with the pulse laser light 33. Controlling the pulse energy centroid position of the EUV light 252 to a predetermined value means that a desired position of the target 27 is irradiated with the pulse laser light 33. Hereinafter, pulse energy of the EUV light 252 may be referred to as EUV energy. The pulse energy centroid position of the EUV light 252 may be simply referred to as the "EUV energy centroid position." Further, performance of the EUV light 252 may be simply referred to as "EUV performance."

2.2 Operation

The EUV light generation control unit 5A outputs a control signal to the target supply device 26. The target material stored in the target supply device 26 is maintained at a temperature equal to or higher than the melting point of the target material by a heater (not shown). The target material in the target supply device 26 is pressurized by inert gas supplied into the target supply device 26.

The target material pressurized by the inert gas is output as a jet through the above-described opening. The jet of the target material is separated into a plurality of droplets (DL) by vibrating components of the target supply device 26 at least around the opening by the above-described vibration device. Each droplet constitutes the target 27. The target 27 moves in the −Y direction along the trajectory from the target supply device 26 to the plasma generation region 25. The target collection unit 28 collects the target 27 that has passed through the plasma generation region 25.

The target 27 output into the chamber 2A travels in the form of a droplet and passes through the target detection region R. The target 27 having passed through the target detection region R is supplied to the plasma generation region 25.

The target sensor 4 detects the timing at which the target 27 has passed through the target detection region R. The EUV light generation control unit 5A receives a passage timing signal transmitted from the target sensor 4. The EUV light generation control unit 5A determines the timing at which the passage timing signal becomes lower than a predetermined threshold value as the timing at which the target 27 passes through the target detection region R. That is, the EUV light generation control unit 5A specifies the timing at which the target 27 passes through the target detection region R based on the detection result of the target sensor 4. The EUV light generation control unit 5A generates a target detection signal indicating that the target 27 passes through the target detection region R at the timing at which the passage timing signal becomes lower than the predetermined threshold value.

The EUV light generation control unit 5A outputs a first trigger signal to the prepulse laser 3P at a timing delayed by a predetermined delay time from the timing at which the target detection signal is generated, the trigger signal giving a trigger to output the prepulse laser light 31P. The prepulse laser 3P outputs the prepulse laser light 31P in accordance with the first trigger signal. The EUV light generation control unit 5A outputs a second trigger signal to the main pulse laser 3M after outputting the first trigger signal. The main pulse laser 3M outputs the main pulse laser light 31M in accordance with the second trigger signal. Thus, the laser device 3 outputs the prepulse laser light 31P and the main pulse laser light 31M in this order. The prepulse laser light 31P preferably has a pulse time width on the order of picoseconds. The picosecond order means the range of 1 ps or more and less than 1 ns. The prepulse laser light 31P may have a pulse time width equal to or more than 1 ns and less than 1 μs.

The prepulse laser light 31P and the main pulse laser light 31M are incident on the laser light travel direction control unit 34A. The prepulse laser light 31P and the main pulse laser light 31M are guided to the light concentrating unit 22A as the pulse laser light 32 via the laser light travel direction control unit 34A. The pulse laser light 32 is reflected by the laser light concentrating mirror 221 included in the light concentrating unit 22A. The pulse laser light 32 reflected by the laser light concentrating mirror 221 is reflected by the laser light concentrating mirror 222 and is concentrated on the plasma generation region 25 as the pulse laser light 33.

The stage 84 adjusts the position of the plate 83 with respect to the plate 82 according to a control signal output from the EUV light generation control unit 5A. By adjusting the position of the plate 83, the positions of the laser light concentrating mirror 221 and the laser light concentrating mirror 222 are adjusted. The plate 83 and the stage 84 constitute a moving stage that moves the laser light concentrating mirror 221 and the laser light concentrating mirror 222. In the following description, the plate 83 and the stage 84 may be collectively referred to simply as the moving stage. The optical path axes of the prepulse laser light 31P and the main pulse laser light 31M included in the pulse laser light 33 are changed simultaneously by moving the laser light concentrating mirror 221 and the laser light concentrating mirror 222. As described above, the focal point of the laser light concentrating mirror 222 and the focal point of the pulse laser light 33 substantially coincide with each other. Therefore, the movement direction and the movement distance of the plate 83 by the stage 84 substantially coincide with the movement direction and the movement distance of the focal point of the pulse laser light 33, respectively.

At the timing when one target 27 reaches the plasma generation region 25, the target 27 is irradiated with the prepulse laser light 31P. The target 27 irradiated with the prepulse laser light 31P is diffused into a mist form. At the timing when the target 27 is diffused into a desired size, the target 27 is irradiated with the main pulse laser light 31M. The target 27 diffused into a mist form by being irradiated with the prepulse laser light 31P is also referred to as a diffusion target 27.

The target 27 irradiated with the main pulse laser light 31M is turned into plasma, and the radiation light 251 is radiated from the plasma. The EUV light 252 included in the radiation light 251 is selectively reflected by the EUV light concentrating mirror 23 and is concentrated on the intermediate focal point 292 at the connection portion 29. The EUV light 252 concentrated on the intermediate focal point 292 is output toward the external apparatus 6.

When the optical path axis of the pulse laser light 33 concentrated on the plasma generation region 25 deviates from the center of the droplet form target 27, a problem such as a decrease in EUV energy occurs. However, it may be difficult to directly measure the deviation between the optical path axis of the pulse laser light 33 and the center of the target 27. Therefore, the EUV light generation control unit 5A controls the optical path axis of the pulse laser light 33 using the EUV energy centroid position as an index according to the following principle.

Figure 4:
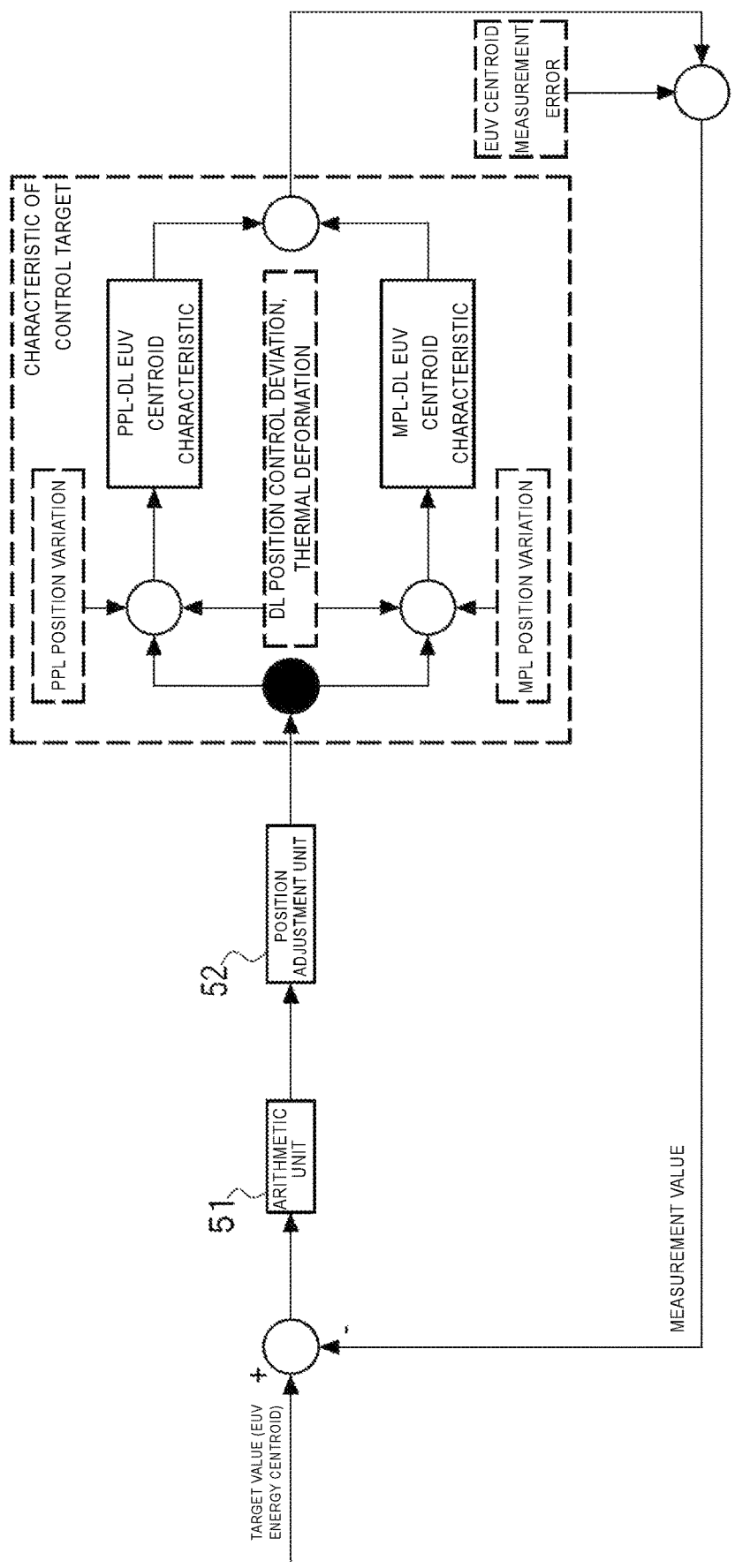
FIG. 4 is a block diagram showing EUV energy centroid control.

FIG. 4 is a block diagram showing EUV energy centroid control. In FIG. 4, PPL-DL means the target 27 to which the prepulse laser light 31P is radiated. MPL-DL means the target 27 to which the main pulse laser light 31M is radiated. The EUV centroid characteristic of PPL-DL indicates the characteristic at the position where the target 27 is irradiated with the prepulse laser light 31P in the plasma generation region 25. The EUV centroid characteristic of MPL-DL indicates the characteristic at the position where the target 27 is irradiated with the main pulse laser light 31M in the plasma generation region 25. The EUV light generation control unit 5A includes an arithmetic unit 51 and a position adjustment unit 52. The arithmetic unit 51 calculates an adjustment amount by PID (Proportional—Integral—Differential) calculation.

The EUV energy centroid position is the centroid position of the EUV energy distribution. The EUV energy centroid position is a spatial position specified from a plurality of measurement values of EUV energy obtained by the plurality of EUV light sensors 70c to 70e.

The EUV energy centroid position is an index for evaluating whether or not the irradiation condition of the pulse laser light 33 satisfies the EUV light performance. Therefore, controlling the EUV energy centroid position to the target centroid position means that the target is appropriately irradiated with the pulse laser light 33.

The EUV light generation control unit 5A evaluates the X-axis coordinate component of the EUV energy centroid position using an evaluation value Cx obtained by the following Equation 1. Further, the EUV light generation control unit 5A evaluates the Y-axis coordinate component of the EUV energy centroid position using an evaluation value Cy obtained by the following Equation 2.

$$Cx[\%]=\{(E3-E2)/(E2+E3)\}\times 100 \quad (1)$$

$$Cy[\%]=\{(E1-E2)/(E1+E2)\}\times 100 \quad (2)$$

E1 represents a measurement value of the EUV energy by the EUV light sensor 70c. E2 represents a measurement value of the EUV energy by the EUV light sensor 70d. E3 represents a measurement value of the EUV energy by the EUV light sensor 70e. Cx indicates the deflection of the EUV energy distribution in the X-axis direction. Cx indicates the deflection of the EUV energy distribution in the Y-axis direction.

The EUV light generation control unit 5A is configured to perform the EUV energy centroid control. The EUV energy centroid control is to perform feedback control on the light concentrating unit 22A so that the EUV energy centroid position becomes the target centroid position based on the respective measurement results of the plurality of EUV light sensors 70c to 70e during the generation of the EUV light 252. Specifically, the EUV light generation control unit 5A has a function of performing the following processes as the EUV energy centroid control.

The EUV light generation control unit 5A outputs a first gate signal to each of the EUV light sensors 70c to 70e at a timing delayed by a predetermined delay time from the timing at which the target detection signal is generated. The first gate signal is a signal that provides a trigger to measure the EUV energy to each of the EUV light sensors 70c to 70e. When the EUV light sensors 70c to 70e each receive the first gate signal, the EUV light sensors 70c to 70e measure the EUV energy and transmit the measurement values E1 to E3 respectively to the EUV light generation control unit 5A.

The EUV light generation control unit 5A evaluates the EUV energy centroid position using Equation 1 and Equation 2 described above. The EUV light generation control unit 5A specifies the deviation between the current EUV energy centroid position and the target centroid position using the evaluation values Cx, Cy. The measurement value of the centroid of the pulse energy of the EUV light 252 when the irradiation position of the pulse laser light 33 with respect to the target 27 is optimized is used as the target centroid position of the EUV energy centroid control.

The EUV light generation control unit 5A drives the stage 84 so that the measurement value of the EUV energy centroid position becomes the target centroid position. Specifically, the arithmetic unit 51 determines the adjustment amount of the stage 84 by performing the PID calculation based on the difference between the measurement value of the pulse energy centroid value and the target centroid position, and transmits the adjustment amount to the position adjustment unit 52. The position adjustment unit 52 drives the stage 84 in accordance with the determined adjustment amount and causes the light concentration position of the pulse laser light 33 to move.

2.3 Problem

As described above, the EUV light generation control unit 5A controls the EUV energy characteristic based on the target centroid position. The position adjustment unit 52 moves the stage 84 based on the adjustment amount calculated by the arithmetic unit 51 to control the pulse laser light 32 that has passed through the combiner 409 so that the measurement value of the EUV energy centroid position becomes the target centroid position.

However, optical elements included in the laser light travel direction control unit 34A and the light concentrating unit 22A may be deformed by being heated by the energy of the pulse laser light, and the optical paths of the prepulse laser light 31P and the main pulse laser light 31M may change. At this time, different changes may occur in the EUV centroid characteristic of PPL-DL and the EUV centroid characteristic of MPL-DL owing to that the temporal variation in the irradiation position of the prepulse laser light 31P is different from the temporal variation in the irradiation position of the main pulse laser light 31M. That is, when the optical path of either the prepulse laser light 31P or the main pulse laser light 31M deviates from the optimum optical axis, the position at which the target 27 is irradiated with the pulse laser light 33 deviates, and the EUV energy centroid value changes. Here, the deviation from the optimum optical axis means that the coaxial relationship between the prepulse laser light 31P and the main pulse laser light 31M is deviated.

The stage 84 is a movable stage that holds and changes the position of the light concentrating unit 22A that concentrates both the prepulse laser light 31P and the main pulse laser light 31M. Therefore, when the coaxial relationship between the prepulse laser light 31P and the main pulse laser light 31M is deviated, even if the stage 84 is moved, the positions of the prepulse laser light 31P and the main pulse laser light 31M cannot be corrected for optimum irradiation of the prepulse laser light 31P and the main pulse laser light 31M. Consequently, the pulse laser light 33 is radiated on a position deviated from the center of the target 27, so that the EUV energy becomes unstable and the amount of unnecessary scattered matters also increases. The scattered matter is also referred to as debris.

Further, errors may occur in the measurement of the EUV energy centroid position calculated by the EUV light sensors 70c to 70e. Since the EUV light generation control unit 5A cannot detect a deviation in the coaxial relationship between the prepulse laser light 31P and the main pulse laser light 31M, the EUV light generation control unit 5A may perform irradiation position control using measurement values including large errors. As a result, a state in which the target 27 is not appropriately irradiated with the pulse laser light 33 may continue. Therefore, it is necessary to use an index other than the EUV energy centroid value in the irradiation position control of the pulse laser light 33 with respect to the target 27.

Therefore, the present disclosure discloses irradiation position control of the pulse laser light 33 with respect to the target 27 using, as indices, conversion efficiency (CE) which is a ratio of the EUV energy to the pulse energy of the main pulse laser light, which will be described later, and EUV energy 3σ representing temporal variation of the EUV energy. Furthermore, an EUV light generation apparatus and an electronic device manufacturing method are disclosed in which, even when the optical path of the pulse laser light 33 is changed by thermal deformation of the optical elements, the deviation of the coaxial relationship between the prepulse laser light 31P and the main pulse laser light 31M is suppressed and the stability of the EUV energy is improved.

3. EUV Light Generation Apparatus of First Embodiment

The EUV light generation apparatus 100 and an EUV light generation method of a first embodiment will be described. Any component same as that described above is denoted by an identical reference sign, and duplicate description thereof is omitted unless specific description is needed.

3.1 Configuration

Figure 5:
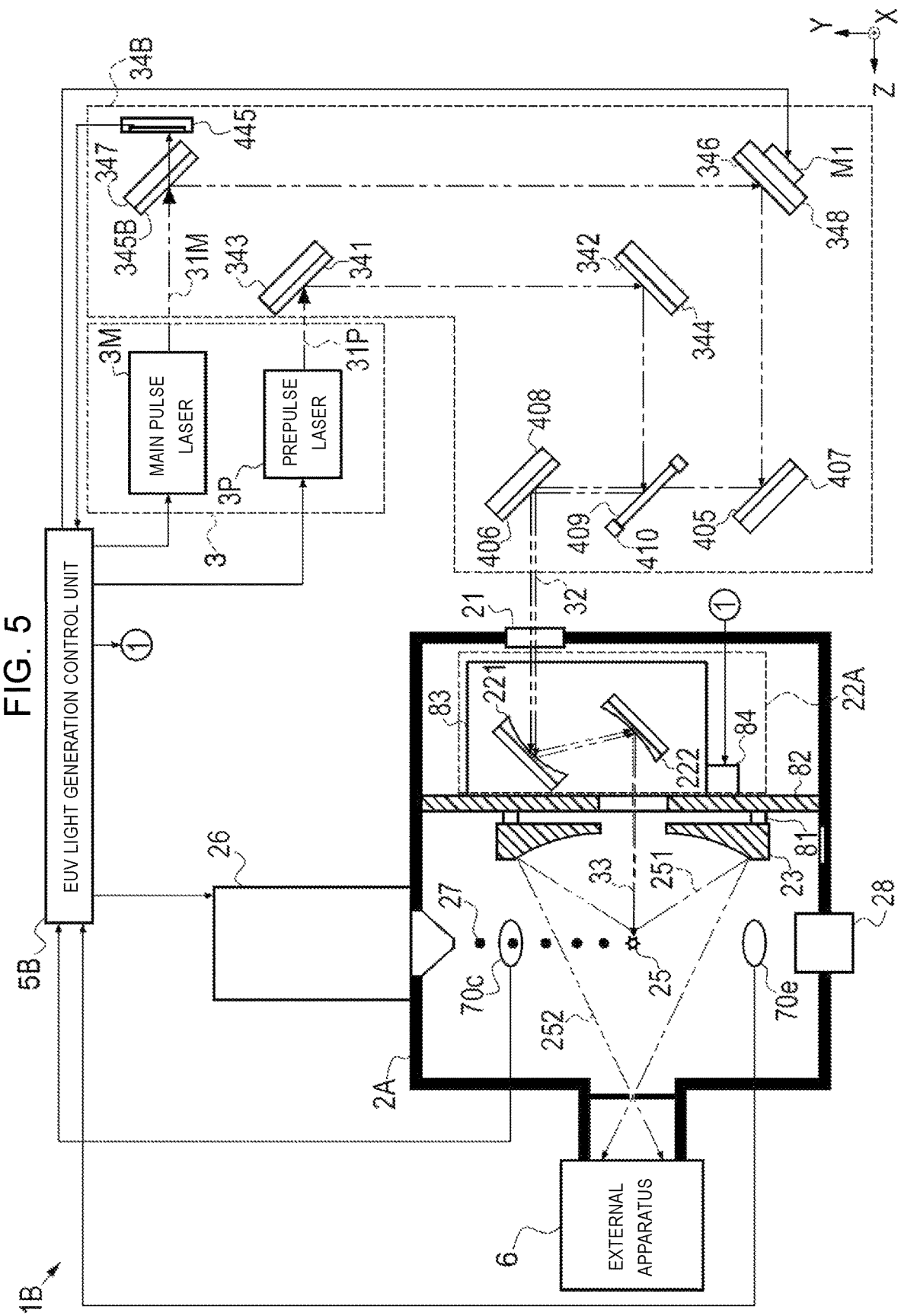
FIG. 5 is diagram schematically showing the configuration of the EUV light generation apparatus according to a first embodiment of the present disclosure.

FIG. 5 schematically shows the configuration of an EUV light generation apparatus 1B according to the first embodiment of the present disclosure. The EUV light generation apparatus 1B according to the first embodiment includes an EUV light generation control unit 5B and a laser light travel direction control unit 34B. The EUV light generation apparatus 1B has a function to compensate for a deviation of the irradiation position when deviation occurs in the respective irradiation positions of the prepulse laser light 31P and the main pulse laser light 31M due to thermal influence or the like.

The EUV light generation control unit 5B controls the pulse energy of the main pulse laser light such that the EUV energy becomes constant during continuous operation of the EUV light generation apparatus 1B. Hereinafter, the pulse energy of the main pulse laser light may be referred to as MPL energy.

Figure 6:
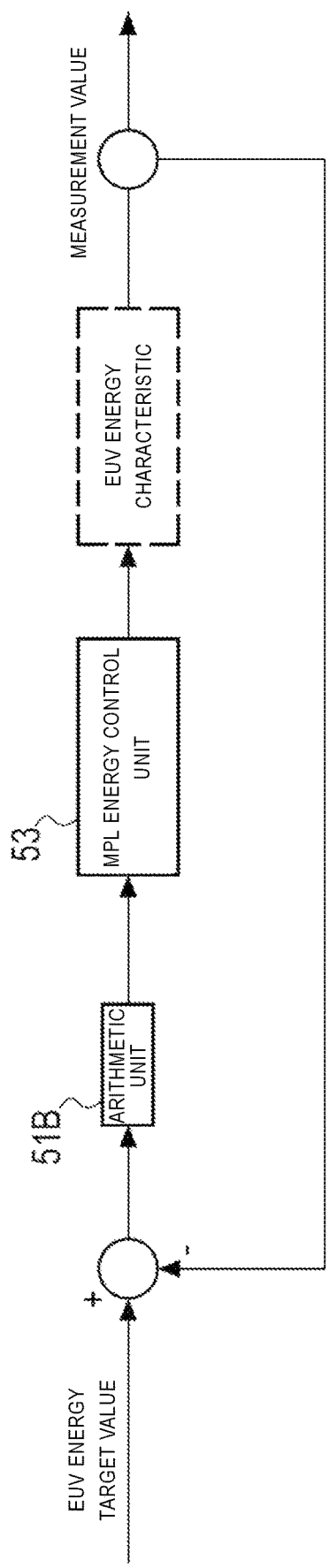
FIG. 6 is a block diagram showing control of pulse energy of main pulse laser light.

FIG. 6 is a block diagram showing control of the MPL energy. The EUV light generation control unit 5B includes an arithmetic unit 51B and an MPL energy control unit 53. The arithmetic unit 51B calculates the adjustment amount by PID calculation.

Specifically, the arithmetic unit 51B performs the PID calculation based on the difference between the sum or average of the measurement values of the EUV energy by the EUV light sensors 70c to 70e and the target value of the EUV energy. The arithmetic unit 51B determines the adjustment amount of the MPL energy to maintain the EUV energy constant by the PID calculation and transmits the adjustment amount to the MPL energy control unit 53. The MPL energy control unit 53 controls the MPL energy by driving the main pulse laser 3M based on the determined adjustment amount.

Therefore, the EUV light generation control unit 5B maintains the EUV energy constant by controlling the MPL energy based on the difference between the measurement values by the EUV light sensors 70c to 70e and the target value of the EUV energy. However, it is difficult to maintain the EUV energy constant only by controlling the MPL energy. This is because the thermal deformation of the optical elements on the optical path changes the characteristics of the EUV energy. Therefore, in the present disclosure, the EUV light generation control unit 5B performs laser irradiation position control B including adjustment of the position at which the target 27 is irradiated with the pulse laser light 33 using the EUV energy 3σ and CE as indices. Here, CE is a value obtained by dividing the EUV energy by the MPL energy. That is, CE is an index representing the conversion efficiency of the MPL energy to the EUV energy.

The stability of the EUV energy can be improved by using the EUV energy 3σ representing the temporal variation of the EUV energy as an index. The EUV energy 3σ is calculated by, for example, the following Equation 3.

$$\text{EUV energy } 3\sigma[\%] = (3\sigma/\mu) \times 100 \quad (3)$$

Here, σ is a standard deviation of the EUV energy for a plurality of pulses included in a unit time. Further, μ is the average value of the EUV energy for multiple pulses included in the unit time. The EUV energy used to calculate the EUV energy 3σ is, for example, the sum or average of the measurement values of the EUV energy by the EUV light sensors 70c to 70e. The unit time is several seconds, for example, about 1 to 5 seconds. Here, for the stability of the EUV energy, for example, n times of σ may be used as an index instead of the EUV energy 3σ.

As described above, CE is an index indicating the performance of the EUV light generation apparatus. However, CE has not been used as an index for controlling the EUV energy for the EUV light generation apparatus that is always required to stably output specified EUV energy. This is because stable EUV energy is not guaranteed when feedback control with CE as an index is performed. That is, when the EUV energy decreases, control is performed to maintain CE constant by decreasing the MPL energy, and the control for maintaining the EUV energy constant may not be performed.

The laser light travel direction control unit 34B includes a laser energy sensor 445, a first actuator M1, and a beam splitter 345B.

The first actuator M1 is attached to the holder 348. The first actuator M1 is arranged to control the optical path axis of the main pulse laser light 31M by changing the posture of the high reflection mirror 346. The first actuator M1 according to the technology of the present disclosure is not limited to the above arrangement. The first actuator M1 may be an actuator capable of controlling the angle of any of the high reflection mirrors for the main pulse laser light 31M from the main pulse laser 3M to the combiner 409. The first actuator M1 is connected to the EUV light generation control unit 5B.

The beam splitter 345B is arranged on the optical path of the main pulse laser light 31M output from the main pulse laser 3M. The beam splitter 345B is supported by the holder 347. That is, the beam splitter 345B is arranged instead of the high reflection mirror 345 in the EUV light generation apparatus 1A. The beam splitter 345B is configured to reflect the main pulse laser light 31M at high reflectance. Further, the beam splitter 345B is configured to transmit part of the main pulse laser light 31M toward the laser energy sensor 445.

The laser energy sensor 445 is an example of the laser energy sensor according to the technology of the present disclosure. The laser energy sensor 445 is arranged on the optical path of the main pulse laser light 31M transmitted through the beam splitter 345B. The laser energy sensor 445 detects the main pulse laser light 31M transmitted through the beam splitter 345B, and outputs the detection result to the EUV light generation control unit 5B. The laser energy sensor 445 is not limited to the arrangement and configuration described above. The laser energy sensor 445 may be arranged such that any high reflection mirror on the optical path of the main pulse laser light 31M from the main pulse laser 3M to the combiner 409 is changed to the beam splitter to measure light transmitted therethrough.

3.2 Operation

Next, operation of the EUV light generation apparatus 1B of the first embodiment will be described. Specifically, the laser irradiation position control B performed by the EUV light generation control unit 5B according to the present embodiment will be described.

Figure 7:
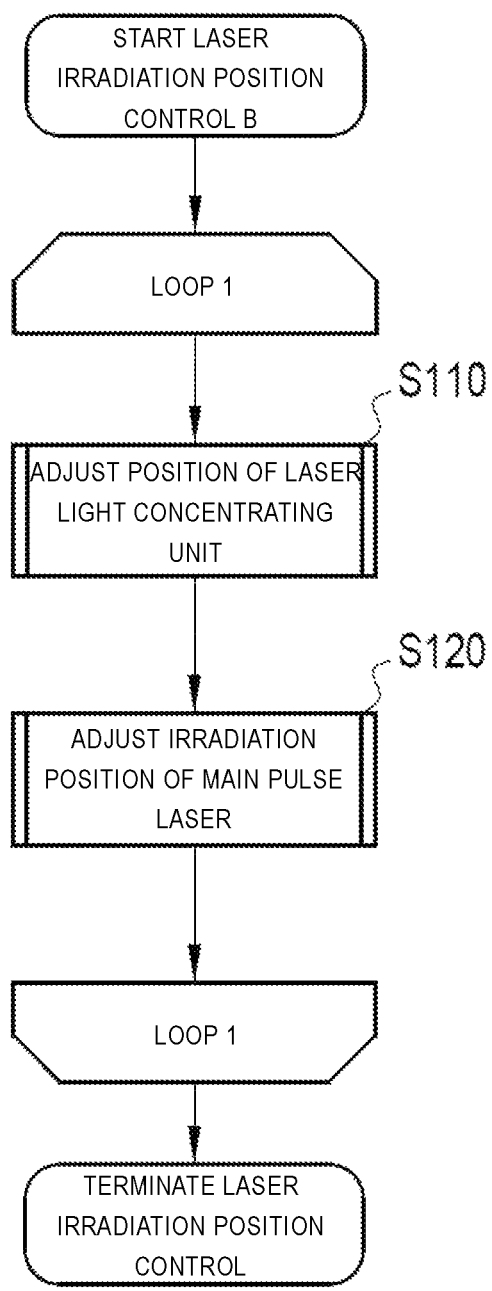
FIG. 7 is a flowchart showing laser irradiation position control in the first embodiment.
Figure 8:
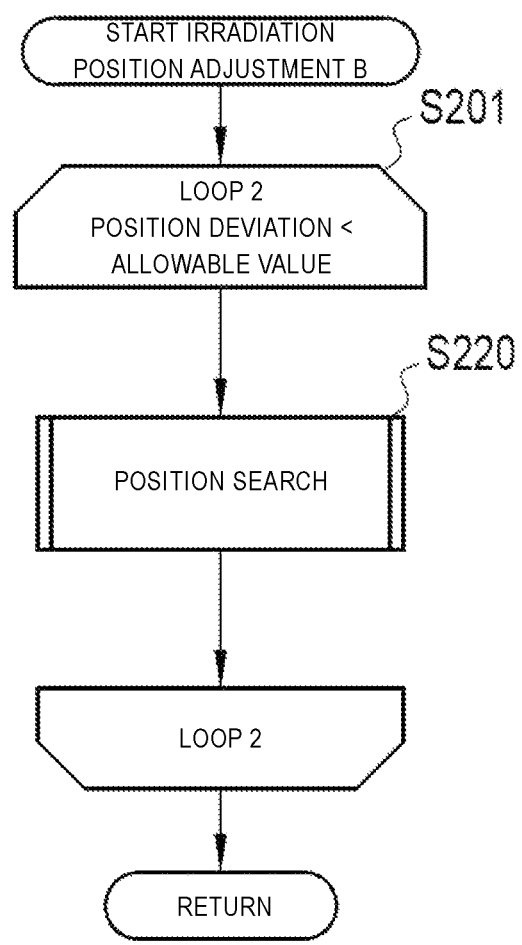
FIG. 8 is a flowchart showing irradiation position adjustment according to the technology of the present disclosure.
Figure 9:
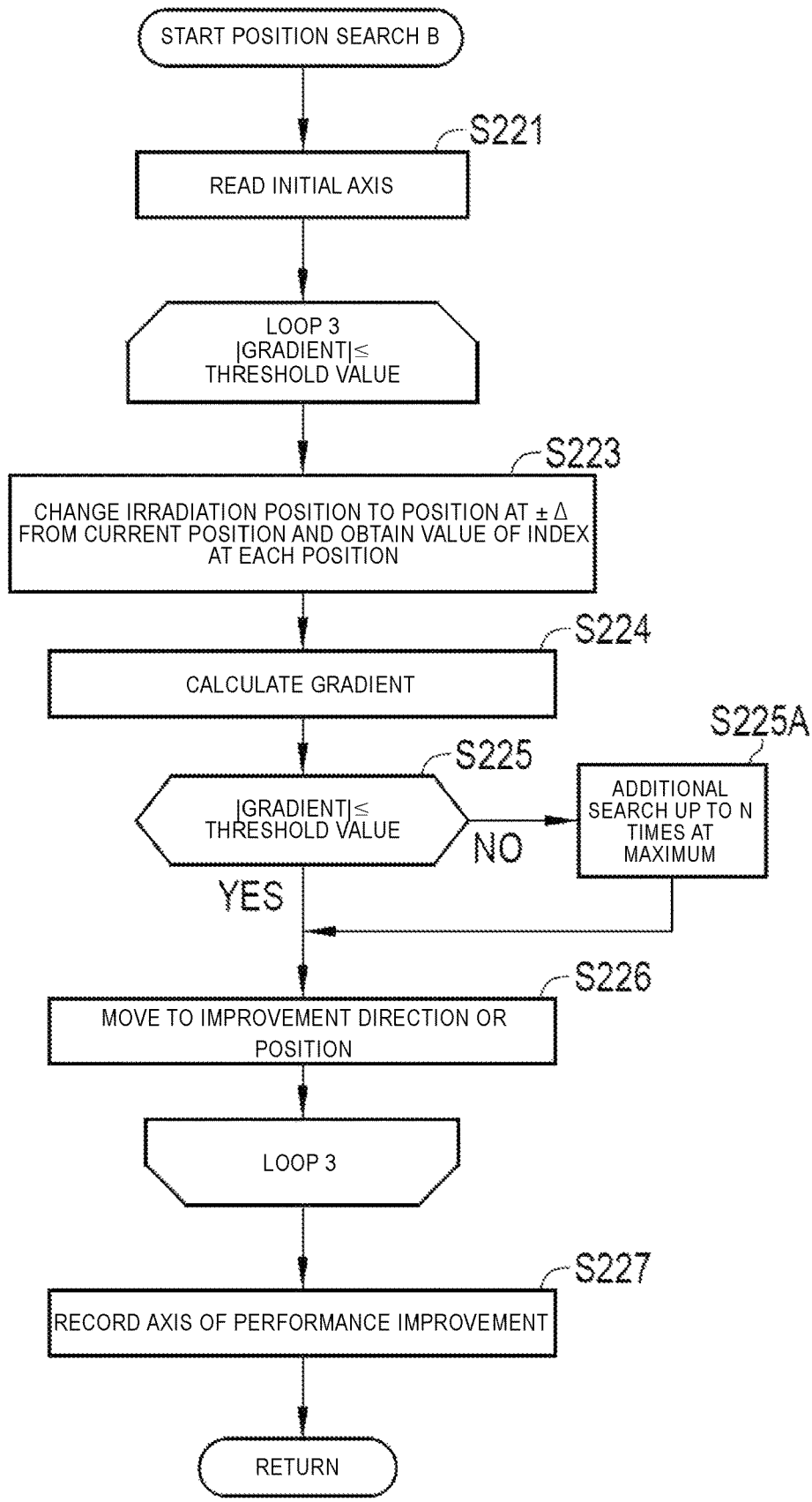
FIG. 9 is a flowchart showing a position search in detail.

FIGS. 7 to 9 are flowcharts showing the processing procedure of the laser irradiation position control B in the first embodiment. FIG. 7 is a flowchart showing the laser irradiation position control B in the first embodiment. In the laser irradiation position control B, a light concentrating unit position adjustment step S110 and a main pulse laser irradiation position adjustment S120 are alternately and repeatedly performed in a loop 1, and when a predetermined termination condition is satisfied, processing exits the loop 1 and the laser irradiation position control B ends. The predetermined termination condition of the loop 1 may be detection of transition to a state involving stop of EUV light generation such as detection of an EUV light output stop command input from the external apparatus 6, for example.

In the light concentrating unit position adjustment step S110, the position of the light concentrating unit 22A is adjusted using the EUV energy 3σ as an index. In the main pulse laser irradiation position adjustment step S120, the irradiation position of the main pulse laser light 31M is adjusted using CE as an index. A common algorithm may be used for the position adjustment of the light concentrating unit 22A and the irradiation position adjustment of the main pulse laser light 31M. Here, different parameters are used for the allowable values of the index, search width Δ, and position deviation.

FIG. 8 is a flowchart showing an outline of the irradiation position adjustment B. The irradiation position adjustment B may be used as the common algorithm for the position adjustment of the light concentrating unit 22A and the irradiation position adjustment of the main pulse laser light 31M. In the irradiation position adjustment B, a loop 2 is performed in the order of the X axis, Y axis, and X axis or in the order of the Y axis, X axis, and Y axis (step S201). In the loop 2, the position search operation is continued until the position deviation becomes less than an allowable value with respect to the X axis or the Y axis of the pulse laser light 33.

For example, in the case that the irradiation position adjustment B is performed in the order of the X axis, Y axis, and X axis, when the position deviation of the two optimum X positions is equal to or less than the allowable value, processing exits the loop 2. On the other hand, in the two X axis searches, when the deviation of the second optimum X position with respect to the first optimum X position exceeds the allowable value, it is determined that further position search is necessary, and the irradiation position search B in step S220 is continued. Here, the allowable value is a predetermined value. The allowable value is an index indicating that no significant improvement can be expected even if the search is further performed. For example, when the deviation of the optimum X position after the second search with respect to the optimum X position after the first search is equal to or less than the allowable value, it is determined that no significant improvement can be expected even if the search is further performed, and processing exits the loop 2.

In step S220, the irradiation position is changed by the search width Δ in the positive and negative directions with respect to the current position, and a performance improving direction is determined from the data of the three positions including the current position. Here, in the present embodiment, the negative direction is arranged on the side opposite to the positive direction with the current position interposed therebetween, but the three positions including the current position according to the technology of the present disclosure are not limited thereto. The three positions including the current position are only required to include the current position, a first point different from the current position, and a second point different from the current position and the first point. The data of the three positions also include the EUV energy 3σ and CE. For the light concentrating unit 22A, the position search is performed in a direction in which the EUV energy 3σ decreases. For the main pulse laser light 31M, the position search is performed in a direction in which CE increases. The search width Δ is determined by the sensitivity of CE to a laser spot position. In the present embodiment, the search width Δ is about 0.5 to 5 μm. The search width Δ may have different values in the X direction and the Y direction. In particular, when the spot intensity distribution is elliptic, it is preferable to set different values in the X direction and the Y direction.

FIG. 9 is a flowchart showing the position search B according to step S220 of FIG. 8 in detail. First, in step S221, the EUV light generation control unit 5B reads the current irradiation position and sets a search axis. Further, a predetermined threshold value, the search width Δ, a minute amount dΔ, and a number of additional searches N are read. The predetermined threshold value, the search width Δ, the minute amount dΔ, and the number of additional searches N may be initially set to constant values and stored in a storage unit.

Next, processing in a loop 3 is performed. In the loop 3, the index at three positions is obtained, and when the absolute value of the gradient thereof is equal to or less than the threshold value, it is determined that the condition of the position search is satisfied, and processing exits the loop 3. Otherwise, processing continues in the loop 3 to satisfy the condition for the position search. Hereinafter, in the present embodiment, the gradient of the index at the three positions may be simply referred to as the gradient.

Figure 10:
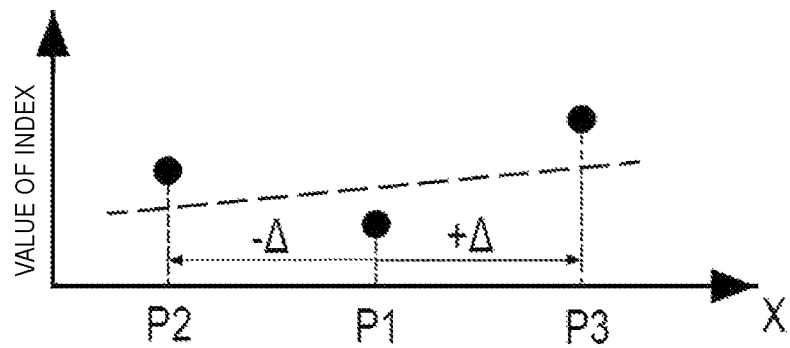
FIG. 10 is a diagram showing an example of obtaining an index.

Specifically, in step S223, the irradiation position is changed by ±Δ from the current position, and the values of the index are obtained at the three positions including the current position. FIG. 10 shows an example of obtaining the index. For example, when the position search B is performed in the X axis, as shown in FIG. 10, the index is obtained at a position P3 where the irradiation position is changed by +Δ from the current position P1 and at a position P2 where the irradiation position is changed by −Δ from the current position P1. Here, the EUV energy 3σ or CE is obtained as the index. In principle, the EUV energy 3σ is obtained when the position search is performed for the light concentrating unit 22A, and CE is obtained when the position search is performed for the main pulse laser light 31M.

In step S224, the gradient of the index at the three positions is calculated based on the values of the index obtained at the three positions including the current position. For example, a linear approximation line is calculated based on the values of the index obtained at P1, P2, and P3, and the slope of the calculated linear approximation line is set as the gradient.

Figure 11:
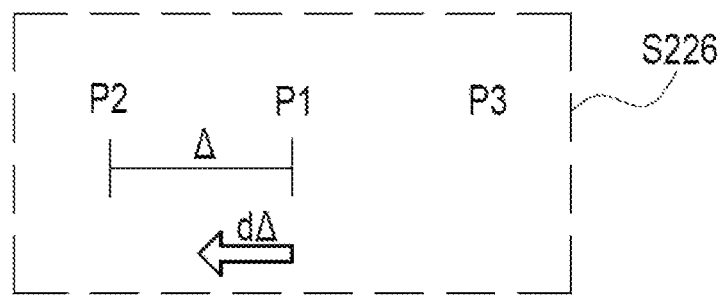
FIG. 11 is a diagram showing an example of movement in an improving direction by a minute amount.

In step S225, the absolute value of the gradient calculated in step S224 is compared with the threshold value, and when the absolute value of the gradient is equal to or less than the threshold value, it is determined that the termination condition of the loop 3 is satisfied, and processing exits the loop 3 after performing movement in the improving direction by a minute amount dΔ. FIG. 11 shows an example of movement in the improving direction by the minute amount dΔ. In step S226, as shown in FIG. 11, movement is performed in the improving direction by the minute amount dΔ, and processing exits the loop 3. Here, dΔ<Δ is satisfied. Further, in step S226, instead of moving in the improving direction, movement may be directly performed to an improving position. Here, the improving direction or the improving position refers to a direction or a position at which the EUV energy 3σ decreases in the case of the position search for the light concentrating unit 22A, and refers to a direction or a position at which CE increases in the case of the position search for the main pulse laser light 31M.

On the other hand, in step S225, when the absolute value of the gradient calculated in step S224 is compared with the threshold value and is greater than the threshold value, processing proceeds to step S225A.

Figure 12:
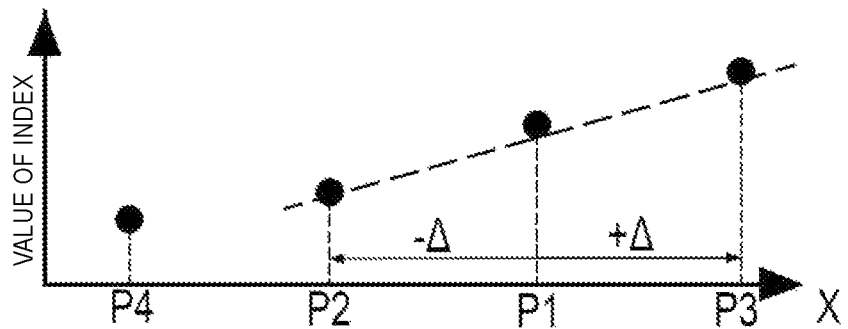
FIG. 12 is a diagram showing an example of obtaining an index by an additional search according to the technology of the present disclosure.

In step S225A, the additional search is performed up to N times at a maximum until the condition in step S225 is satisfied. In the present embodiment, the additional search is performed only in the improving direction determined in step S225, but the additional search according to the technology of the present disclosure is not limited thereto, and the additional search may be performed in a direction other than the improving direction. FIG. 12 shows an example of obtaining the index by the additional search. For example, as shown in FIG. 12, when one additional search is performed, a position P4 moved from the position P2 by the search width Δ becomes the additional search position. After performing the additional search up to N times at a maximum, processing proceeds to step S226.

Figure 13:
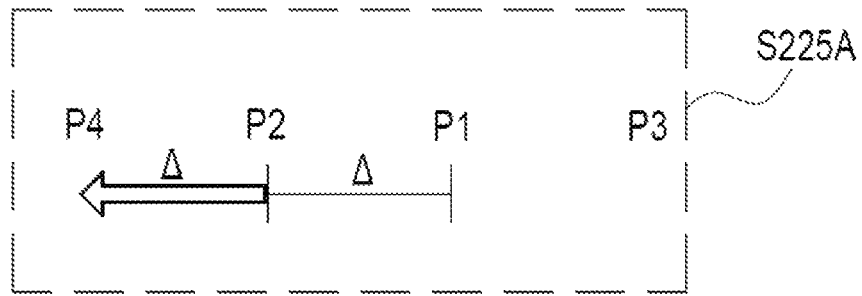
FIG. 13 is a diagram showing an example of movement to an additional search position.

FIG. 13 shows an example of a movement to an additional search position. In step S226, after moving to the additional search position P4 by the search width Δ as shown in FIG. 13, processing returns to step S223, and the position search process is performed again so as to satisfy the termination condition of the loop 3.

That is, in the loop 3, the position search is performed until the absolute value of the gradient becomes equal to or less than the threshold value. When the condition of the loop 3 is satisfied and processing exits the loop 3 after the additional search is performed up to N times at a maximum, processing proceeds to step S227.

In step S227, the axis improved by the additional search is recorded. The recorded axis is overwritten as the search axis to be read in step S221, and is searched for first in the next position search. On the other hand, with respect to positions where the condition of the loop 3 is satisfied without the occurrence of the additional search, the position search B is ended without performing the process of step S227.

As described above, the EUV light generation control unit 5B performs the position search B by controlling the stage 84 and the first actuator M1 based on the gradient of the index at three positions.

Other operations of the EUV light generation apparatus 1B of the first embodiment may be similar to those of the EUV light generation apparatus 1A of the comparative example.

3.3 Effects

As described above, the EUV light generation apparatus 1B of the present embodiment includes the prepulse laser 3P configured to output the prepulse laser light 31P to be radiated to the target 27 supplied into the chamber 2, the main pulse laser 3M configured to output the main pulse laser light 31M to be radiated to the target 27 irradiated with the prepulse laser light 31P, the combiner 409 configured to combine optical paths of the prepulse laser light 31P and the main pulse laser light 31M, the light concentrating unit 22A configured to concentrate, on the target 27, the prepulse laser light 31P and the main pulse laser light 31M having optical paths combined, the stage 84 configured to change the position of the light concentrating unit 22A, the first actuator M1 arranged upstream of the combiner 409 and configured to change the travel direction of the main pulse laser light 31M before the optical paths are combined, the EUV light sensors 70c to 70e configured to detect the EUV energy of the EUV light radiated from the target 27 irradiated with the main pulse laser light 31M, the laser energy sensor 445 configured to detect the pulse energy of the main pulse laser light 31M before being radiated to the target 27, and the EUV light generation control unit 5B configured to control the stage 84 so that temporal variation of the EUV energy detected by the EUV light sensors 70c to 70e decreases and to control the first actuator M1 so that CE which is the ratio of the EUV energy with respect to the pulse energy detected by the laser energy sensor 445 increases.

The EUV light generation control unit 5B controls the irradiation position of the main pulse laser light 31M using CE, which has not been conventionally used, as the index. Further, the EUV light generation control unit 5B controls the irradiation position of the pulse laser light 33 by adjusting the position of the light concentrating unit 22A using the EUV energy 3σ as the index. As a result, it is possible to suppress the deviation of the coaxial relationship between the prepulse laser light 31P and the main pulse laser light 31M due to thermal deformation of the optical elements.

Further, since the irradiation positions of the prepulse laser light 31P and the main pulse laser light 31M with respect to the target 27 are always maintained in an appropriate state, the EUV energy can be stabilized. In addition, operating under a condition in which CE is high reduces the generation of debris and improves the lifetime of the EUV light concentrating mirror 23.

4. EUV Light Generation Apparatus of Second Embodiment

Next, the EUV light generation apparatus and the EUV light generation method of a second embodiment will be described. Any component same as that described above is denoted by an identical reference sign, and duplicate description thereof is omitted unless specific description is needed.

4.1 Configuration

Figure 14:
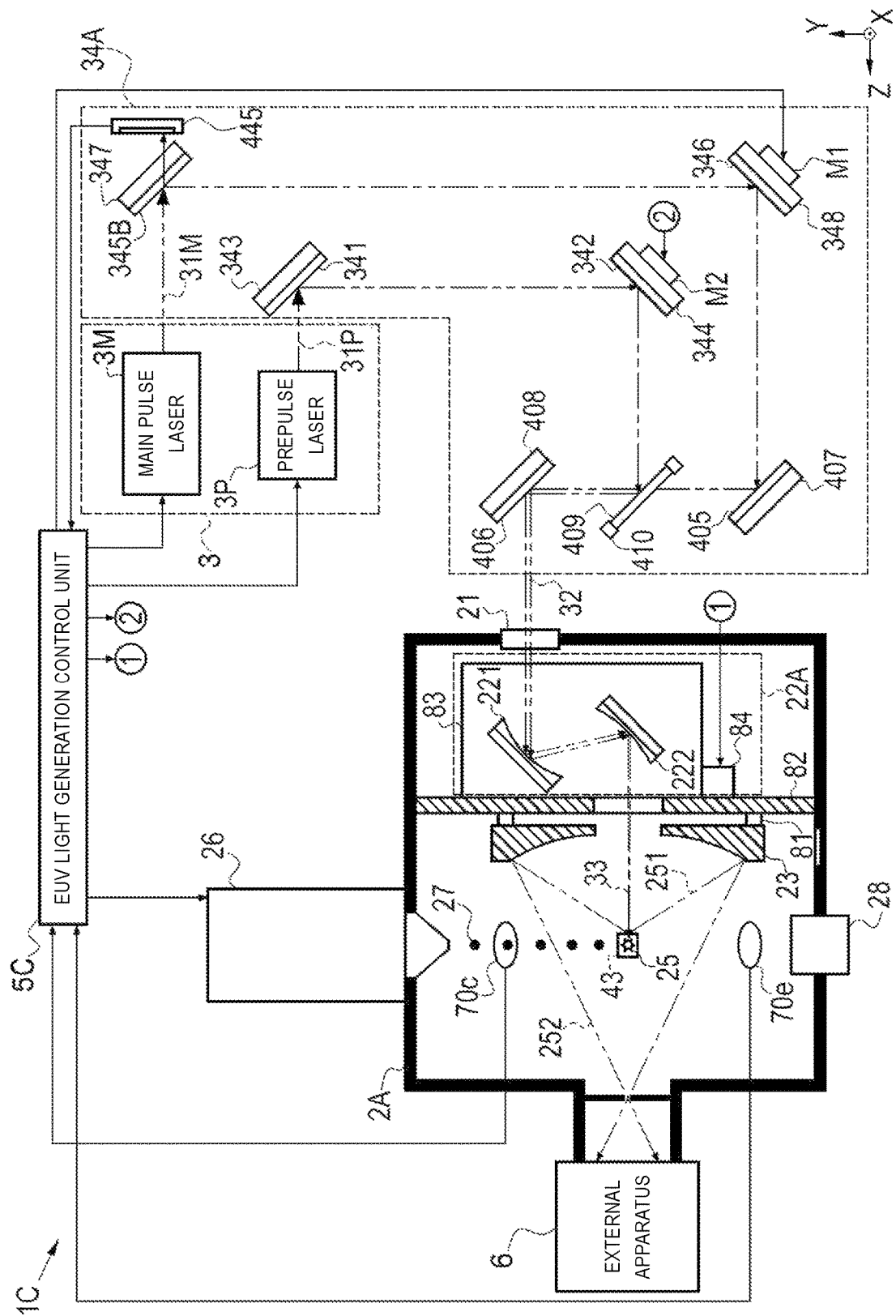
FIG. 14 is a diagram schematically showing the configuration of the EUV light generation apparatus according to a second embodiment.

FIG. 14 schematically shows the configuration of an EUV light generation apparatus 1C according to the second embodiment. As shown in FIG. 14, the EUV light generation apparatus 1C according to the second embodiment further includes a mist sensor 43 and a second actuator M2. Other configurations of the EUV light generation apparatus 1C are similar to those of the EUV light generation apparatus 1B according to the first embodiment.

The target 27 supplied to the plasma generation region 25 is irradiated with the prepulse laser light 31P concentrated on the plasma generation region 25 at a first irradiation timing. When the target 27 is irradiated with the prepulse laser light 31P, the target 27 is broken and transformed into a mist form in which fine particles such as micro droplets and clusters are dispersed into a mist form.

The mist sensor 43 is arranged on the wall of the chamber 2A so as to face the plasma generation region 25. The mist sensor 43 obtains an image by imaging the diffusion target 27, and transmits the image to an EUV light generation control unit 5C. The operation of the mist sensor 43 is controlled by the EUV light generation control unit 5C.

Figure 15:
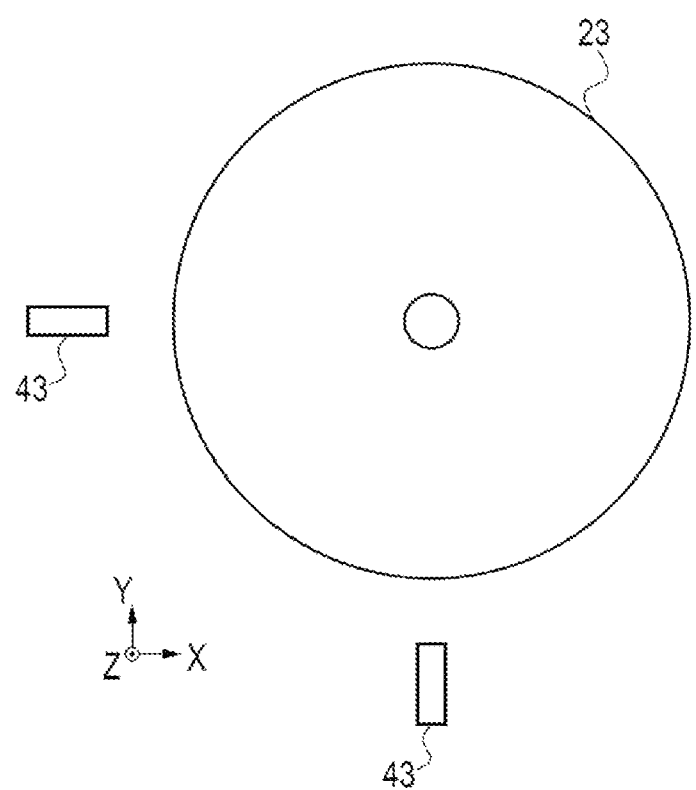
FIG. 15 is a diagram showing an example of the arrangement of a mist sensor.

The mist sensor 43 is configured of, for example, a charge-coupled device (CCD) image sensor, and images the target 27 illuminated by lighting equipment (not shown) or a shadowgraph of the target 27. Here, a plurality of mist sensors 43 may be arranged. FIG. 15 shows an example of the arrangement of the mist sensor 43. For example, as shown in FIG. 15, two mist sensors 43 may be arranged such that their observation axes form an angle of 90 degrees therebetween.

Figure 16:
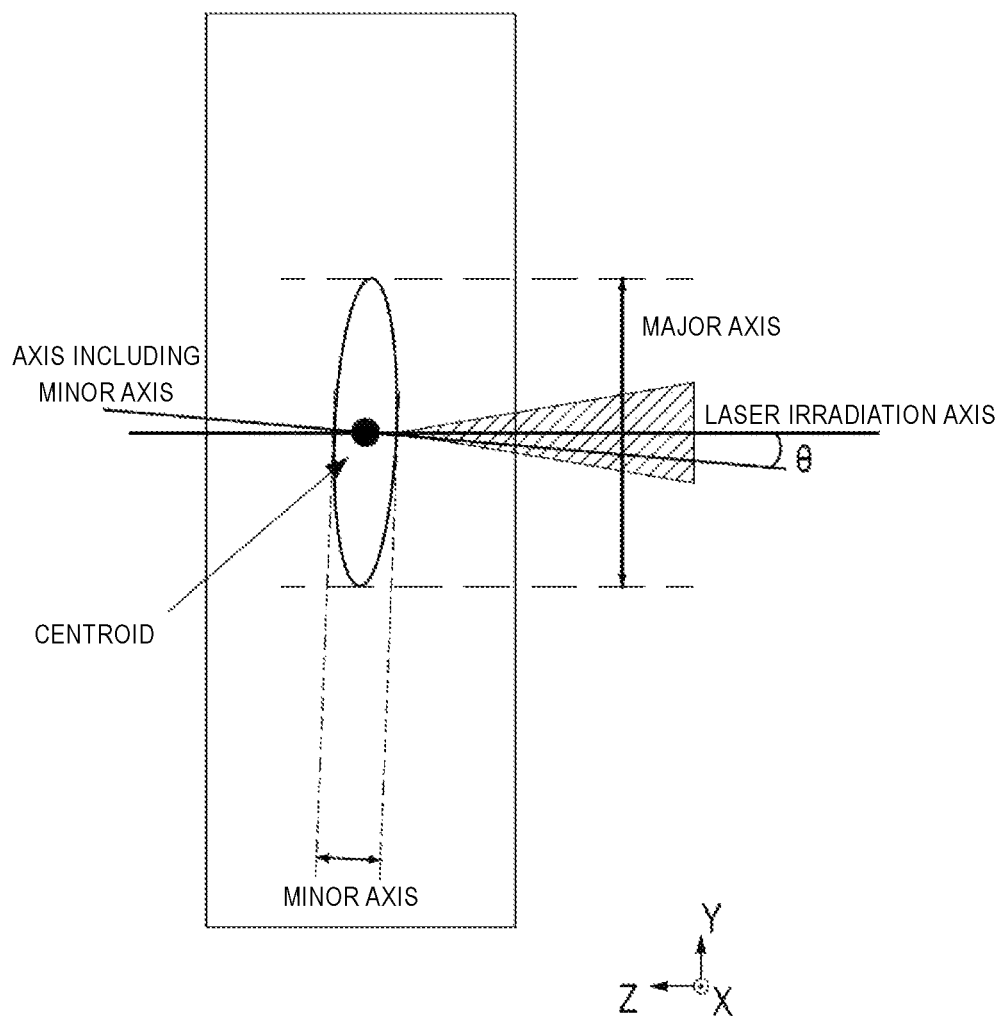
FIG. 16 is a diagram showing an example of an image of a diffusion target imaged by the mist sensor.

FIG. 16 shows an example of an image of the diffusion target 27 imaged by the mist sensor 43. The EUV light generation control unit 5C obtains the image shown in FIG. 16 as an example by controlling the mist sensor 43 to perform imaging at a timing after outputting the prepulse laser light 31P.

The EUV light generation control unit 5 obtains a characteristic value of the diffusion target 27 based on the image imaged by the mist sensor 43. The characteristic value is a value related to the difference between the irradiation position of the prepulse laser light 31P on the target 27 and the centroid position of the target 27. The characteristic value includes at least one of inclination, size, and a position of the diffusion target 27. As the irradiation position of the prepulse laser light 31P deviates from the centroid position of the target 27, the inclination of the diffusion target 27 increases. Further, as the irradiation position of the prepulse laser light 31P deviates from the centroid position of the target 27, the size of the diffusion target 27 decreases. Further, as the irradiation position of the prepulse laser light 31P deviates from the centroid position of the target 27, the amount of change in the position of the diffusion target 27 decreases.

For example, as shown in FIG. 16, when the shape of the diffusion target 27 is elliptic, the inclination of the diffusion target 27 can be obtained from an angle θ formed by an axis including the minor axis of the ellipse and the irradiation axis of the prepulse laser light 31P. The size of the diffusion target 27 is obtained based on the major axis and the minor axis of the ellipse. The position of the diffusion target 27 is obtained from the coordinates of the centroid of the ellipse.

The second actuator M2 is attached to the holder 344. The second actuator M2 is arranged to control the optical path axis of the prepulse laser light 31P by changing the posture of the high reflection mirror 342. The second actuator M2 is not limited to the above arrangement. The second actuator M2 may be an actuator capable of controlling the angle of any of the high reflection mirrors for the prepulse laser light 31P from the prepulse laser 3P to the combiner 409. The second actuator M2 is connected to the EUV light generation control unit 5C.

The EUV light generation control unit 5C controls the second actuator M2 based on the obtained characteristic value such as the inclination, size, and position of the diffusion target 27. The EUV light generation control unit 5C controls the second actuator M2 to change the position and direction of the prepulse laser light 31P.

4.2 Operation

Next, operation of the EUV light generation apparatus 1C of the second embodiment will be described. Specifically, laser irradiation position control C performed by the EUV light generation control unit 5C according to the present embodiment will be described.

Figure 17:
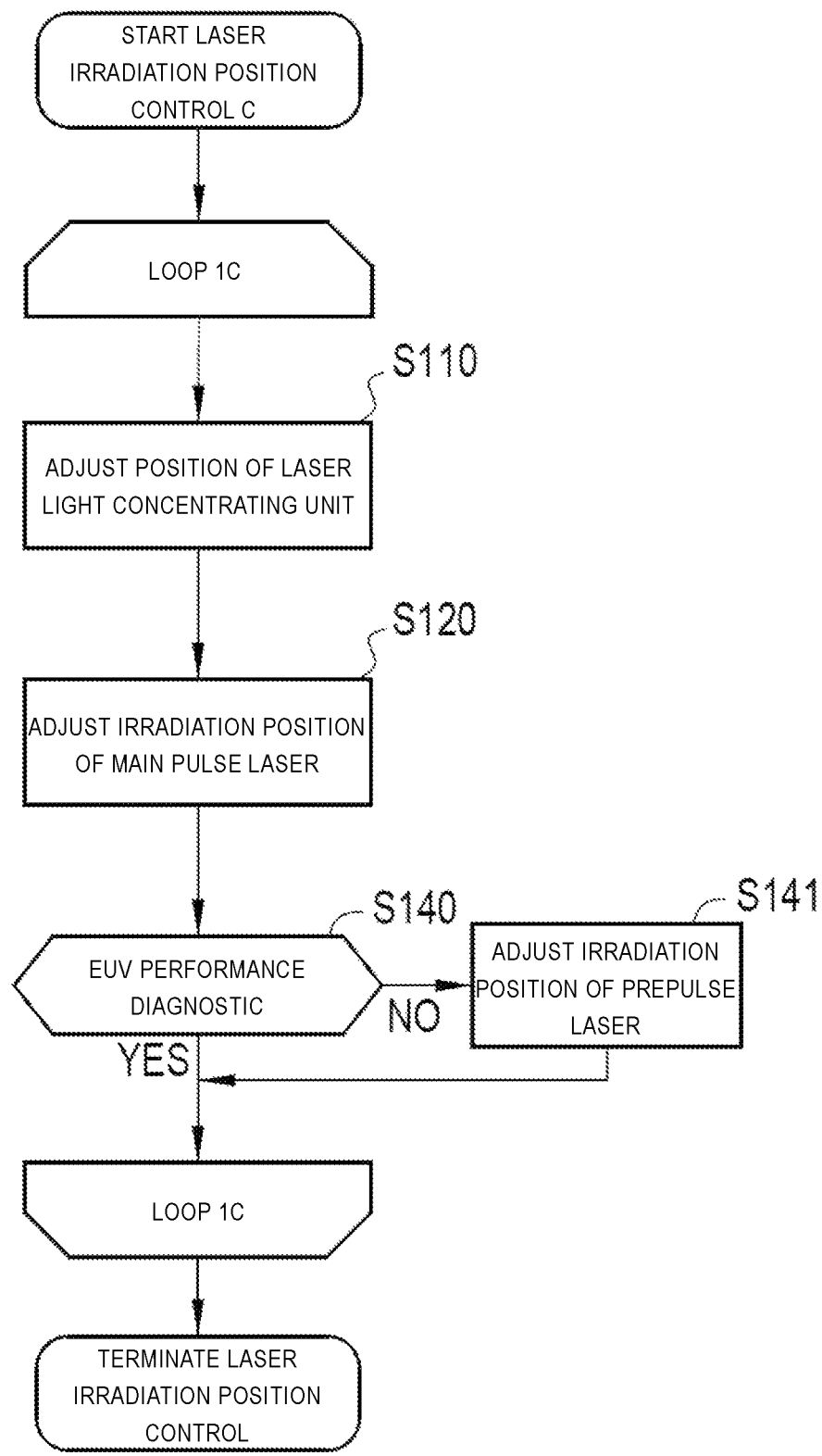
FIG. 17 is a flowchart showing the laser irradiation position control in the second embodiment.
Figure 18:
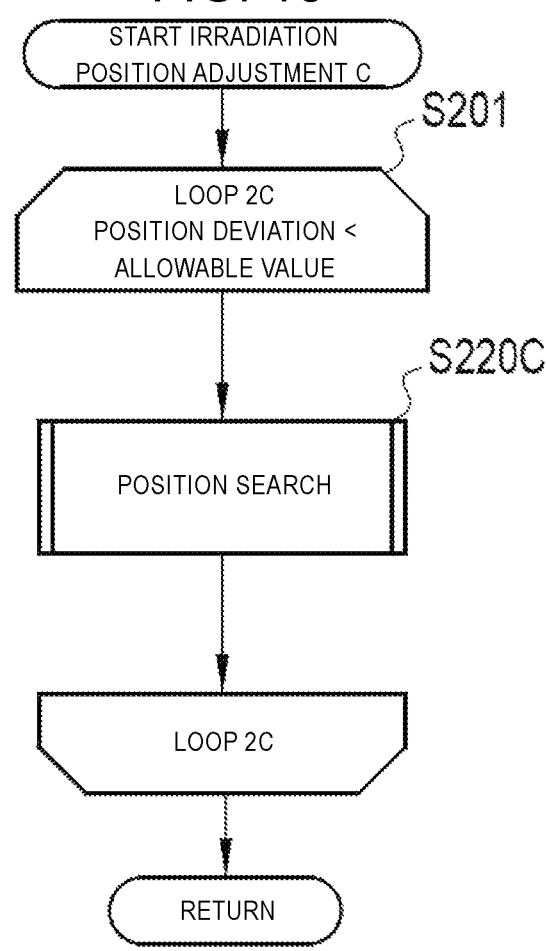
FIG. 18 is a flowchart showing the irradiation position adjustment according to the technology of the present disclosure.
Figure 19:
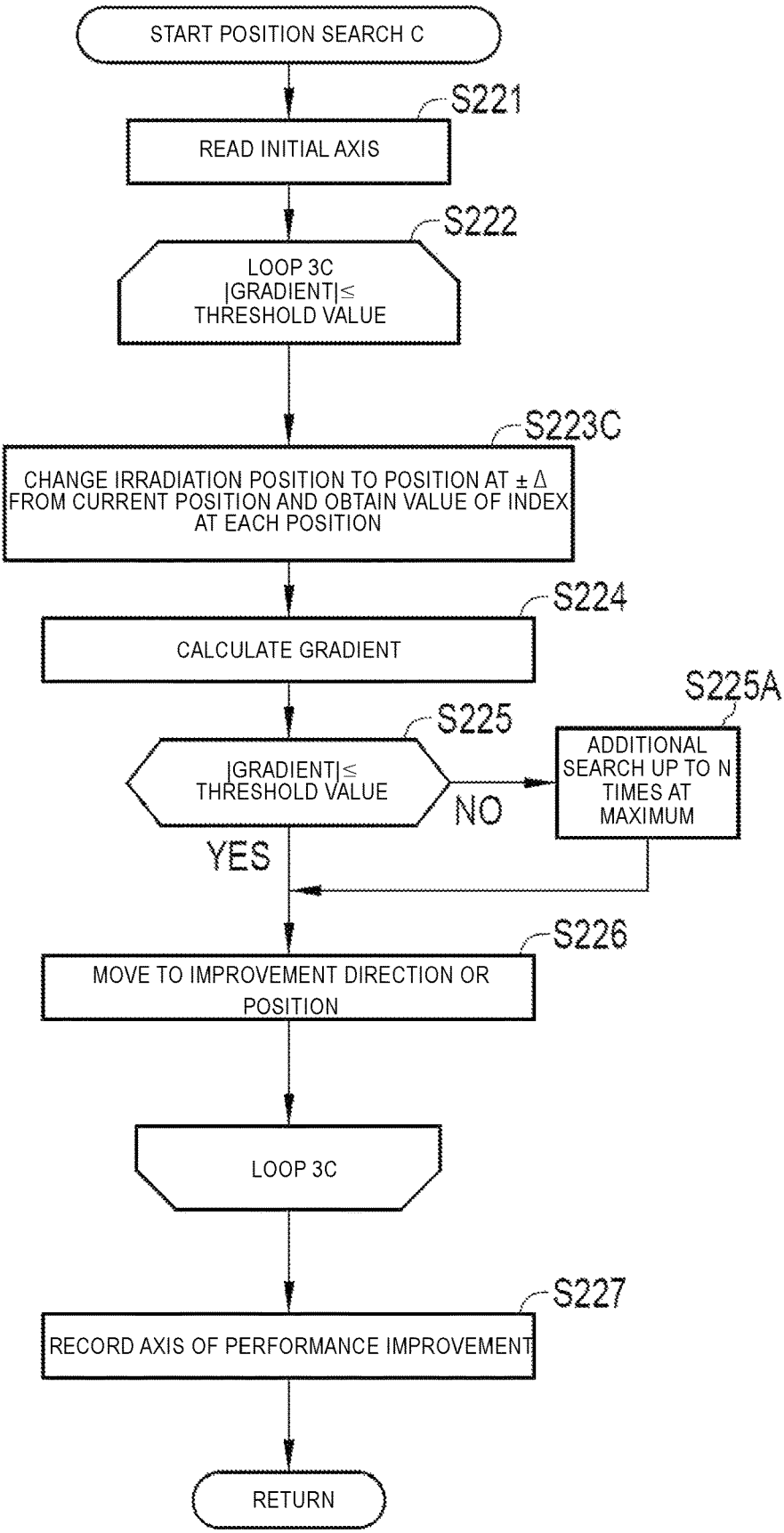
FIG. 19 is a flowchart showing the position search in detail.

FIGS. 17 to 19 are flowcharts showing the processing procedure of an optical path axis adjustment in the second embodiment. FIG. 17 is a flowchart showing the laser irradiation position control C in the second embodiment.

The laser irradiation position control C of the second embodiment further includes step S140 for diagnosing the EUV performance and step S141 for adjusting the prepulse laser irradiation position as compared to the laser irradiation position control B of the first embodiment. That is, in the laser irradiation position control C, step S110, step S120, step S140, and step S141 are sequentially and repeatedly performed, and when a predetermined termination condition is satisfied, processing exits a loop 1C and the laser irradiation position control C ends. The predetermined termination condition of the loop 1C may be detection of transition to a state involving stop of EUV light generation such as detection of an EUV light output stop command input from the external apparatus 6, for example.

In step S140, the EUV energy 3σ and CE are diagnosed as the EUV performance. When the EUV performance is within a predetermined range, the loop 1C is repeated. On the other hand, when the EUV performance is out of the predetermined range, processing proceeds to step S141.

In step S141, the EUV light generation control unit 5C controls the second actuator M2 using the characteristic value of the diffusion target 27 as the index. The EUV light generation control unit 5C controls the second actuator M2 to change the position and direction of the prepulse laser light 31P. Thus, the irradiation position of the prepulse laser light 31P with respect to the target 27 can always be maintained in an appropriate state.

FIG. 18 is a flowchart showing irradiation position adjustment C according to the technology of the present disclosure. The irradiation position adjustment C according to the second embodiment is similar to that of the first embodiment except that a position search step S220C is performed instead of the position search step S220 of the first embodiment in a loop 2C.

FIG. 19 is a flowchart showing a position search C in detail. Compared with the position search B according to the first embodiment, the position search C is similar to that of the first embodiment except that step S223C is performed instead of step S223 of the first embodiment in a loop 3C.

In step S223C, the process is similar to that in step S223 except that the characteristic value of the diffusion target 27 is obtained as the index. That is, in the position adjustment C, the EUV light generation control unit 5C searches the irradiation position of the prepulse laser light 31P by controlling the second actuator M2 based on the obtained characteristic value of the diffusion target 27.

4.3 Effects

As described above, the EUV light generation apparatus 1C of the present embodiment includes the prepulse laser 3P configured to output the prepulse laser light 31P to be radiated to the target 27 supplied into the chamber 2, the main pulse laser 3M configured to output the main pulse laser light 31M to be radiated to the target 27 irradiated with the prepulse laser light 31P, the combiner 409 configured to combine optical paths of the prepulse laser light 31P and the main pulse laser light 31M, the light concentrating unit 22A configured to concentrate, on the target 27, the prepulse laser light 31P and the main pulse laser light 31M having optical paths combined, the stage 84 configured to change the position of the light concentrating unit 22A, the first actuator M1 arranged upstream of the combiner 409 and configured to change the travel direction of the main pulse laser light 31M before the optical paths are combined, the second actuator M2 configured to adjust the irradiation position of the prepulse laser light 31P, the EUV light sensors 70c to 70e configured to detect the EUV energy of the EUV light radiated from the target 27 irradiated with the main pulse laser light 31M, the laser energy sensor 445 configured to detect the pulse energy of the main pulse laser light 31M before being radiated to the target 27, the mist sensor 43 configured to obtain the characteristic value of the diffusion target 27, and the EUV light generation control unit 5c configured to control the stage 84 so that the EUV energy 3σ which indicates the temporal variation of the EUV energy detected by the EUV light sensors 70c to 70e decreases, to control the first actuator M1 so that CE which is the ratio of the EUV energy with respect to the pulse energy detected by the laser energy sensor 445 increases, and to control the second actuator M2, based on the characteristic value of the diffusion target 27, so that the irradiation position of the prepulse laser light 31P is maintained in an appropriate state.

In addition to the effects of the EUV light generation apparatus 1B according to the first embodiment, in the EUV light generation apparatus 1C according to the second embodiment, the irradiation position of the prepulse laser light 31P with respect to the target 27 can always be maintained in an appropriate state. As a result, it is possible to maintain the irradiation position of the prepulse laser light 31P and the irradiation position of the main pulse laser light 31M in an appropriate state even when the coaxial relationship between the prepulse laser light 31P and the main pulse laser light 31M changes due to thermal deformation of the optical elements.

4.4 Modification

In the second embodiment, various modifications can be made to the EUV light generation apparatus. For example, in the laser irradiation position control C, when the high reflection mirror 346 and the high reflection mirror 342 have a common offset, compensation can be performed by the light concentrating unit 22A.

Figure 20:
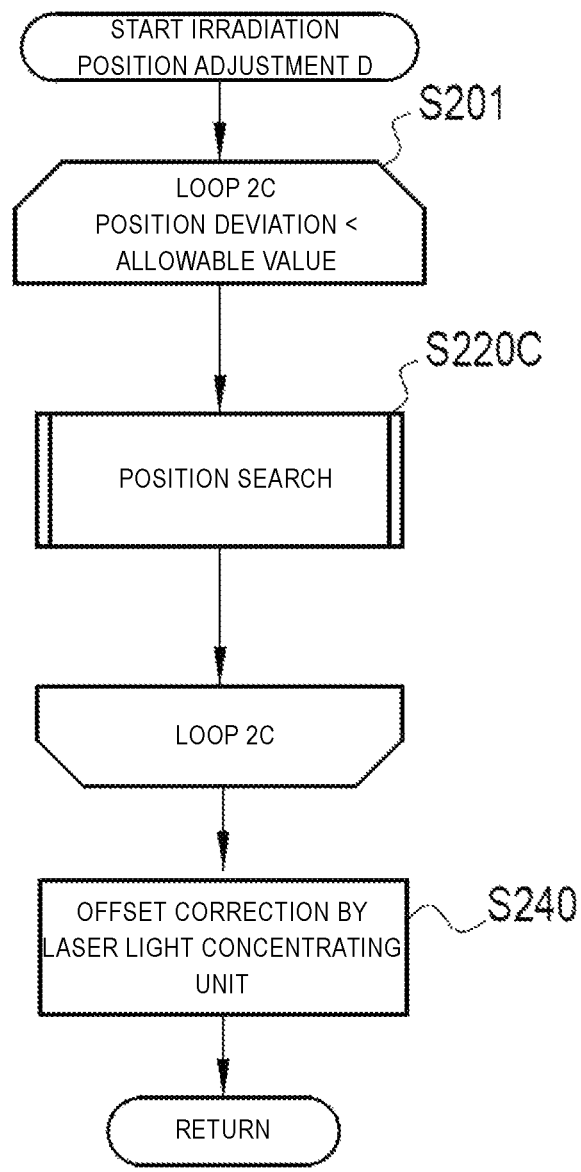
FIG. 20 shows a flowchart of the irradiation position adjustment including a process of compensating by a light concentrating unit.

FIG. 20 shows a flowchart of an irradiation position adjustment D including the process of compensating by the light concentrating unit 22A. The irradiation position adjustment D is similar to the irradiation position adjustment C except that step S240 is included.

In step S240, adjustment of the light concentrating unit 22A corresponding to the common offset of the high reflection mirror 346 and the high reflection mirror 342 is performed. In the case of the light concentrating unit 22A, the adjustment amount by the offset is calculated by an encoder value. In the case of the main pulse laser light 31M and the prepulse laser light 31P, calculation is performed based on a control target of a pointing sensor or encoder values of the actuators M1, M2. The control target of the pointing sensor may be a parameter related to an angular displacement of each of the optical path axes of the prepulse laser light 31P and the main pulse laser light 31M detected by the pointing sensor (not shown).

For example, when the irradiation position adjustment amount of the prepulse laser light 31P is +15 μm in the X direction and the irradiation position adjustment amount of the main pulse laser light 31M is +20 μm in the X direction, the light concentrating unit 22A is moved by +15 μm in the X direction. At this time, the irradiation positions of the main pulse laser light 31M and the prepulse laser light 31P are offset by −15 μm in the X direction in synchronization with the operation of the light concentrating unit 22A.

It is known that the laser spot intensity distribution changes depending on the incident positions of the main pulse laser light 31M and the prepulse laser light 31P on the light concentrating unit 22A. Therefore, by the offset compensation, it is possible to minimize a change in the incident positions of the main pulse laser light 31M and the prepulse laser light 31P on the light concentrating unit 22A. This makes it possible to suppress the change in the laser spot intensity distribution, thereby contributing to lowering the EUV energy 3σ and maintaining CE high. Further, it is possible to ensure the control range of the irradiation position adjustment amount of the prepulse laser light 31P and the irradiation position adjustment amount of the main pulse laser light 31M.

5. Others

Figure 21:
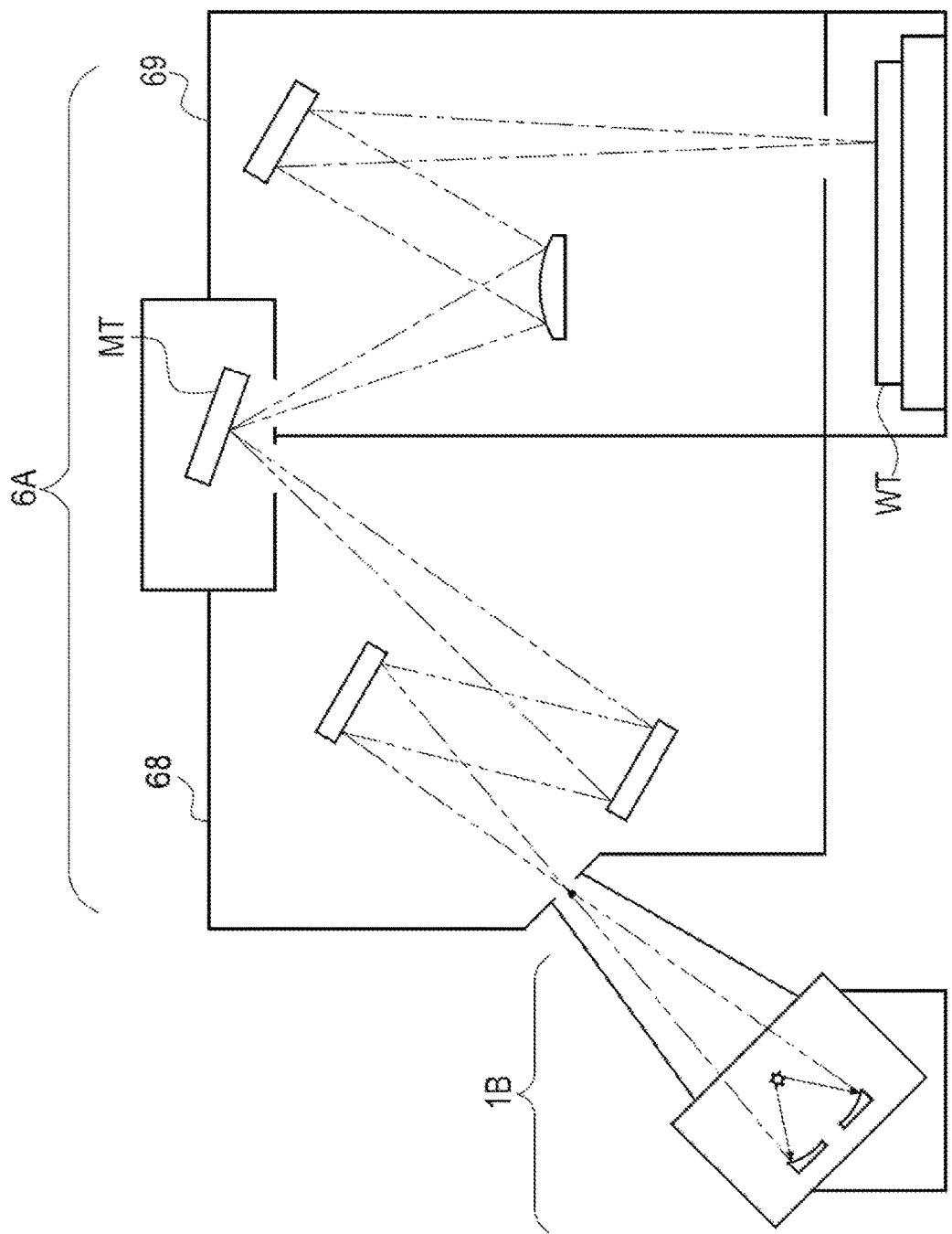
FIG. 21 schematically shows the configuration of an exposure apparatus connected to the EUV light generation apparatus.

FIG. 21 schematically shows the configuration of an exposure apparatus 6A connected to the EUV light generation apparatus 1B. In FIG. 21, the exposure apparatus 6A as the external apparatus 6 includes a mask irradiation unit 68 and a workpiece irradiation unit 69. The mask irradiation unit 68 illuminates, via a reflection optical system, a mask pattern of the mask table MT with the EUV light incident from the EUV light generation apparatus 1B. The workpiece irradiation unit 69 images the EUV light reflected by the mask table MT onto a workpiece (not shown) arranged on a workpiece table WT via a reflection optical system. The workpiece is a photosensitive substrate such as a semiconductor wafer on which photoresist is applied. The exposure apparatus 6A synchronously translates the mask table MT and the workpiece table WT to expose the workpiece to the EUV light reflecting the mask pattern. Through the exposure process as described above, a device pattern is transferred onto the semiconductor wafer, thereby an electronic device can be manufactured.

Figure 22:
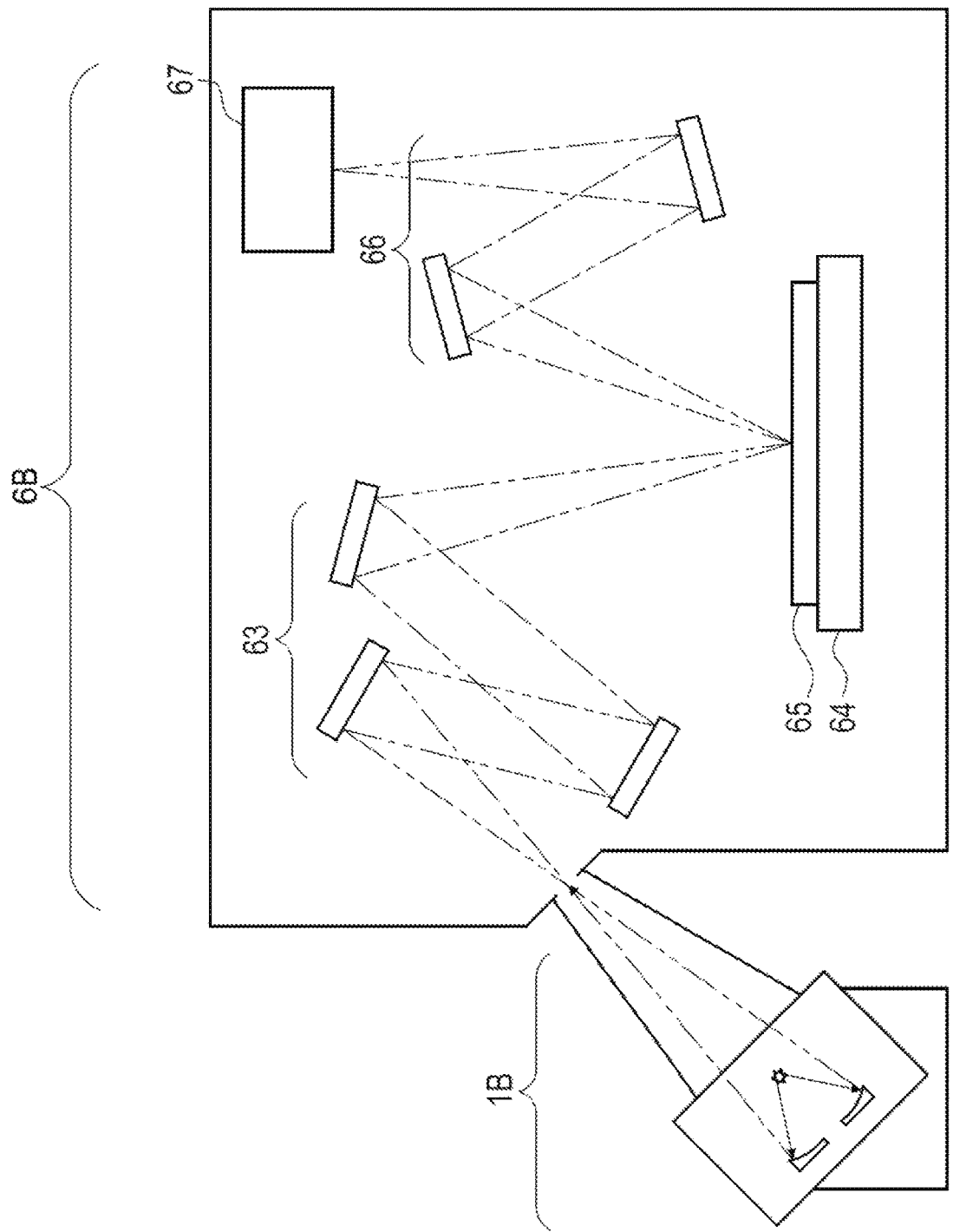
FIG. 22 schematically shows the configuration of an inspection apparatus connected to the EUV light generation apparatus.

FIG. 22 schematically shows the configuration of an inspection apparatus 6B connected to the EUV light generation apparatus 1B. In FIG. 22, the inspection apparatus 6B as the external apparatus 6 includes an illumination optical system 63 and a detection optical system 66. The EUV light generation apparatus 1B outputs, as a light source for inspection, EUV light to the inspection apparatus 6B. The illumination optical system 63 reflects the EUV light incident from the EUV light generation apparatus 1B to illuminate a mask 65 placed on a mask stage 64. Here, the mask 65 conceptually includes a mask blanks before a pattern is formed. The detection optical system 66 reflects the EUV light from the illuminated mask 65 and forms an image on a light receiving surface of a detector 67. The detector 67 having received the EUV light obtains the image of the mask 65. The detector 67 is, for example, a time delay integration (TDI) camera. Defects of the mask 65 are inspected based on the image of the mask 65 obtained by the above-described process, and a mask suitable for manufacturing an electronic device is selected using the inspection result. Then, the electronic device can be manufactured by exposing and transferring the pattern formed on the selected mask onto the photosensitive substrate using the exposure apparatus 6A.

In the inspection apparatus 6B, the above-described EUV light concentrating mirror 23 may be a grazing incidence type. Further, in FIGS. 21 and 22, instead of the EUV light generation apparatus 1B, the EUV light generation apparatus 1C may be used.

The description above is intended to be illustrative and the present disclosure is not limited thereto. Therefore, it would be obvious to those skilled in the art that various modifications to the embodiments of the present disclosure would be possible without departing from the spirit and the scope of the appended claims.

The terms used throughout the present specification and the appended claims should be interpreted as non-limiting terms. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of the any thereof and any other than A, B, and C.

What is claimed is:

1. An EUV light generation apparatus, comprising:
   a prepulse laser configured to output prepulse laser light to be radiated to a target supplied into a chamber;
   a main pulse laser configured to output main pulse laser light to be radiated to the target irradiated with the prepulse laser light;
   a combiner configured to combine optical paths of the prepulse laser light and the main pulse laser light;
   a light concentrating unit configured to concentrate, on the target, the prepulse laser light and the main pulse laser light having the optical paths combined;
   a stage configured to change a position of the light concentrating unit;
   a first actuator arranged upstream of the combiner and configured to change a travel direction of the main pulse laser light before the optical paths are combined;
   an EUV light sensor configured to detect EUV energy of EUV light radiated from the target irradiated with the main pulse laser light; and
   a laser energy sensor configured to detect pulse energy of the main pulse laser light before being radiated to the target,
   wherein the EUV light generation apparatus is configured to control the stage so that temporal variation of the EUV energy detected by the EUV light sensor decreases and to control the first actuator so that a ratio of the EUV energy with respect to the pulse energy detected by the laser energy sensor increases.

2. The EUV light generation apparatus according to claim 1,
   wherein the EUV light generation apparatus alternately controls the stage and the first actuator.

3. The EUV light generation apparatus according to claim 1,
   wherein the EUV light generation apparatus changes irradiation positions to a current position, a first point different from the current position, and a second point different from the current position and the first point, obtains, as incides, the temporal variation of the EUV energy and the ratio at each of three positions including the current position, the first point, and the second point, calculates a gradient of the incides at the three positions, and controls the stage and the first actuator based on the gradient.

4. The EUV light generation apparatus according to claim 3,
   wherein the second point is located on a side opposite to the first point with the current position interposed therebetween.

5. The EUV light generation apparatus according to claim 1,
   wherein the EUV light generation apparatus controls the pulse energy of the main pulse laser light to maintain the EUV energy constant.

6. The EUV light generation apparatus according to claim 1, further comprising:
   a mist sensor configured to obtain a characteristic value of a diffusion target which is the target irradiated with the prepulse laser light; and
   a second actuator configured to adjust the irradiation position of the prepulse laser light,
   wherein the EUV light generation apparatus controls the second actuator based on the characteristic value.

7. The EUV light generation apparatus according to claim 6,
wherein the characteristic value includes at least one of inclination, size, and a position of the diffusion target.

8. The EUV light generation apparatus according to claim 6,
wherein, in a case that position adjustment of the main pulse laser light by the first actuator and irradiation position adjustment of the prepulse laser light by the second actuator have a common offset, the EUV light generation apparatus changes the position of the light concentrating unit corresponding to the offset.

9. An electronic device manufacturing method, comprising:
generating EUV light by irradiating a target with pulse laser light in an EUV light generation apparatus;
outputting the EUV light to an exposure apparatus; and
exposing a photosensitive substrate to the EUV light in the exposure apparatus to manufacture an electronic device,
the EUV light generation apparatus including:
a prepulse laser configured to output prepulse laser light to be radiated to the target supplied into a chamber;
a main pulse laser configured to output main pulse laser light to be radiated to the target irradiated with the prepulse laser light;
a combiner configured to combine optical paths of the prepulse laser light and the main pulse laser light;
a light concentrating unit configured to concentrate, on the target, the prepulse laser light and the main pulse laser light having the optical paths combined;
a stage configured to change a position of the light concentrating unit;
a first actuator arranged upstream of the combiner and configured to change a travel direction of the main pulse laser light before the optical paths are combined;
an EUV light sensor configured to detect EUV energy of the EUV light radiated from the target irradiated with the main pulse laser light; and
a laser energy sensor configured to detect pulse energy of the main pulse laser light before being radiated to the target,
wherein the EUV light generation apparatus is configured to control the stage so that temporal variation of the EUV energy detected by the EUV light sensor decreases and to control the first actuator so that a ratio of the EUV energy with respect to the pulse energy detected by the laser energy sensor increases.

10. An inspection method comprising:
generating EUV light by irradiating a target with pulse laser light in an EUV light generation apparatus;
outputting the EUV light to an inspection apparatus as a light source for inspection; and
exposing a mask to the EUV light to inspect the mask in the inspection apparatus,
the EUV light generation apparatus including:
a prepulse laser configured to output prepulse laser light to be radiated to the target supplied into a chamber;
a main pulse laser configured to output main pulse laser light to be radiated to the target irradiated with the prepulse laser light;
a combiner configured to combine optical paths of the prepulse laser light and the main pulse laser light;
a light concentrating unit configured to concentrate, on the target, the prepulse laser light and the main pulse laser light having the optical paths combined;
a stage configured to change a position of the light concentrating unit;
a first actuator arranged upstream of the combiner and configured to change a travel direction of the main pulse laser light before the optical paths are combined;
an EUV light sensor configured to detect EUV energy of the EUV light radiated from the target irradiated with the main pulse laser light; and
a laser energy sensor configured to detect pulse energy of the main pulse laser light before being radiated to the target,
wherein the EUV light generation apparatus is configured to control the stage so that temporal variation of the EUV energy detected by the EUV light sensor decreases and to control the first actuator so that a ratio of the EUV energy with respect to the pulse energy detected by the laser energy sensor increases.

* * * * *